(12) United States Patent
Hirose et al.

(10) Patent No.: US 10,857,471 B2
(45) Date of Patent: Dec. 8, 2020

(54) CASE

(71) Applicant: NINTENDO CO., LTD., Kyoto (JP)

(72) Inventors: Shinji Hirose, Kyoto (JP); Yasuhiro Inoue, Kyoto (JP); Yuki Ijiri, Kyoto (JP); Shinichi Kasuno, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/224,095

(22) Filed: Dec. 18, 2018

(65) Prior Publication Data

US 2019/0217208 A1 Jul. 18, 2019

(30) Foreign Application Priority Data

Jan. 16, 2018 (JP) ................................. 2018-005191

(51) Int. Cl.
*A63F 13/98* (2014.01)
*A63F 13/24* (2014.01)

(52) U.S. Cl.
CPC .............. *A63F 13/98* (2014.09); *A63F 13/24* (2014.09)

(58) Field of Classification Search
None
See application file for complete search history.

(56) References Cited

U.S. PATENT DOCUMENTS

| 10,173,130 B2* | 1/2019 | Yamazaki | A63F 13/24 |
| 2007/0045951 A1* | 3/2007 | Robertson | A63F 13/98 |
| | | | 273/148 B |
| 2007/0066394 A1* | 3/2007 | Ikeda | A63F 13/06 |
| | | | 463/37 |
| 2008/0015017 A1* | 1/2008 | Ashida | A63F 13/02 |
| | | | 463/37 |
| 2009/0038721 A1* | 2/2009 | Wakitani | A63F 13/02 |
| | | | 150/154 |

(Continued)

FOREIGN PATENT DOCUMENTS

| CN | 205643874 U | 10/2016 |
| EP | 2 135 651 B1 | 4/2011 |

(Continued)

OTHER PUBLICATIONS

Diaz, Jesus. "Recession Cardboard iPhone Case Matches My Furniture." Published Sep. 11, 2009.< https://gizmodo.com/recession-cardboard-iphone-case-matches-my-furniture-5357228>. (Year: 2009).*

(Continued)

*Primary Examiner* — Seng H Lim
(74) *Attorney, Agent, or Firm* — Nixon & Vanderhye, P.C.

(57) ABSTRACT

This case is a case configured to accommodate a controller, the controller including: a first main surface; a second main surface provided on a side opposite to the first main surface; a first side surface and a second side surface provided on both ends in a longer direction of the first main surface and the second main surface; and a first side end surface and a second side end surface provided on both ends in a shorter direction of the first main surface and the second main surface. The controller further includes: a first operation portion provided on the first main surface; a second operation portion provided on the first end surface; a third operation portion provided on the second main surface; and an image capturing section provided on the second end surface.

26 Claims, 26 Drawing Sheets

(56) References Cited

U.S. PATENT DOCUMENTS

| | | | |
|---|---|---|---|
| 2009/0318227 A1 | 12/2009 | Nakajima | |
| 2010/0062855 A1* | 3/2010 | Chong | A63F 13/98 463/37 |
| 2010/0178981 A1* | 7/2010 | Holcomb | A63B 21/0603 463/37 |
| 2010/0279771 A1* | 11/2010 | Block | A63F 13/98 463/37 |
| 2011/0263328 A1* | 10/2011 | Yamashita | A63F 13/213 463/36 |
| 2011/0275437 A1* | 11/2011 | Minchella Jennings | A63F 13/98 463/38 |
| 2011/0306424 A1* | 12/2011 | Kazama | A63F 13/245 463/37 |
| 2012/0098837 A1* | 4/2012 | Hulbert | A63F 13/98 345/473 |
| 2013/0095723 A1* | 4/2013 | Sadri | A63H 33/08 446/101 |
| 2019/0054382 A1* | 2/2019 | Morris | A63F 13/98 |

FOREIGN PATENT DOCUMENTS

| | | |
|---|---|---|
| GB | 2483491 A | 3/2012 |
| JP | 2009-39156 | 2/2009 |

OTHER PUBLICATIONS

Fastsnail. Apr. 20, 2017. <https://www.amazon.com/FastSnail-compatible-Nintendo-Switch-Wear-resistant/dp/B06Y6BX6HT/ref=nav_signin?dchild=1&keywords=Grip+Controller%E2%80%A6>. Accessed Aug. 17, 2020 (Year: 2017).*

European Search Report dated Mar. 8, 2019 issued in European Application No. 18214001.2 (8 pgs.).

* cited by examiner

F I G. 6
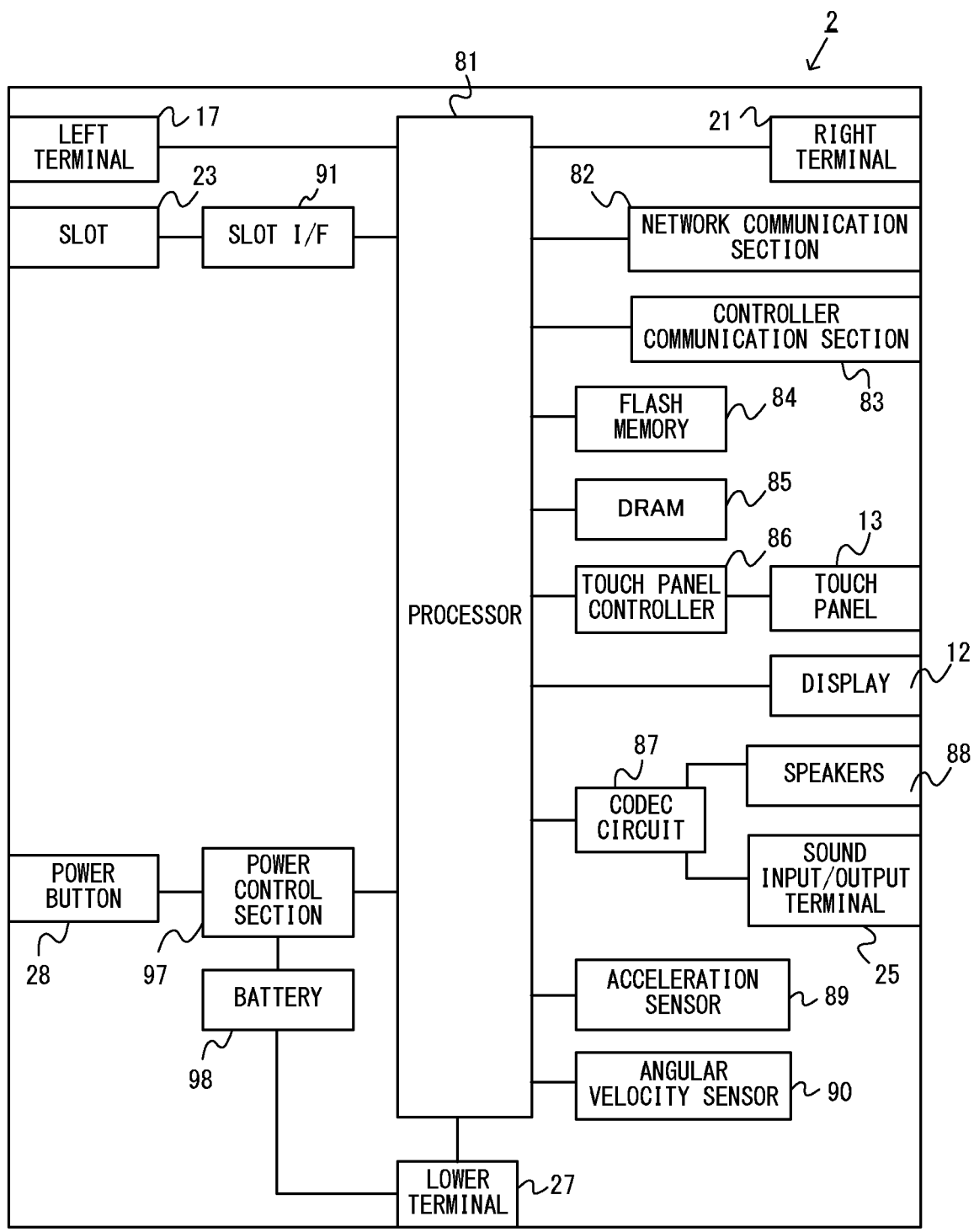

CASE

This application claims priority to JP 2018-005191 filed Jan. 16, 2018, the entire contents of each of which is hereby incorporated by reference.

TECHNICAL FIELD

The present invention relates to a case for accommodating a controller to be used for a game or the like.

BACKGROUND ART

Controllers used for games or the like are sometimes used while contained in a case, in order to prevent damage when impact from the outside is received. For example, JP 2009-39156A discloses a cover made of an elastic material such as rubber.

SUMMARY OF THE INVENTION

Incidentally, the above-described cover mainly fulfills a role of covering the outer surface of the controller, mainly for the purpose of being held by a hand. However, the functions of controllers have become diverse, and various uses are conceivable, such as using the controller not only by holding it with the hand, but also by placing it on another member or mounting it on another device. Accordingly, a case for a controller with high convenience corresponding to various uses has been desired. The present invention was made to solve this problem, and it is an object thereof to provide a case for a controller, according to which it is possible to further improve convenience.

A first case is a case configured to accommodate a controller, the controller including: a first main surface; a second main surface provided on a side opposite to the first main surface; a first side surface and a second side surface provided on both ends in a longer direction of the first main surface and the second main surface; and a first side end surface and a second side end surface provided on both ends in a shorter direction of the first main surface and the second main surface. The controller further includes: a first operation portion provided on the first main surface; a second operation portion provided on the first end surface; a third operation portion provided on the second main surface; and an image capturing section provided on the second end surface. The case includes: a case main body portion having an accommodating space in which the controller can be accommodated; and at least one protruding portion protruding from the case main body portion. The case main body portion is formed into a lengthwise shape including: a first end portion configured to face the first end surface of the controller when the controller is accommodated in the accommodating space; and a second end portion configured to face the second end surface of the controller when the controller is accommodated in the accommodating space. The case main body portion is provided with: a first opening portion that is provided on the second end portion side and is for allowing image capture of the outside of the case main body portion by the image capturing section when the controller is accommodated in the accommodating space; a second opening portion from which at least part of the first operation portion is exposed when the controller is accommodated in the accommodating space; and a third opening portion from which at least part of the third operation portion is exposed when the controller is accommodated in the accommodating space. The protruding portion is disposed on the first end portion side with respect to the third opening portion.

According to this configuration, the protruding portions protruding from the case main body portion are provided, and therefore the case can be held by coming into contact with another member, using these protruding portions. Furthermore, the protruding portions also contribute to making it easier to grip by hooking onto the hand when held with the hand, in some cases. That is, various usage methods are possible due to providing the protruding portions, and the convenience when the controller is used while accommodated in the case can be improved. For example, when image capture is to be performed using a camera in the controller, the position of the case can be fixed by bringing the protruding portions into contact with another member, and therefore the distance from the camera to the target object can be fixed easily. For this reason, the convenience when using the controller accommodated in the case can be improved.

Note that the first to third operation portions each include at least one operator such as an operation button and an analog stick. Also, a member that bulges so as to guide the operator, such as a later-described bulging portion, can also be included in the operation portion.

The case main body portion can have various configurations, but for example, the following configuration is possible.

In the above-described first case, the protruding portion can have a contact surface that faces the second end portion side.

When the contact surface facing this second end portion side is provided, the protruding portion can be brought into contact more reliably with another member such that the second end portion faces downward. Note that "contact" in this context means being in some kind of contact relationship with another member, including a case of simply coming into contact with another member, as well as a mode of hooking onto another member.

With the above-described first case, the region constituting the contact surface in the protruding portion can be made of a plurality of layers of paperboard.

When the engaging portion is made of multiple layers of paperboard in this manner, the contact surface can be made strong, and for example, it is possible to prevent the engaging portion from being damaged even if it is engaged with another member repeatedly.

It should be noted that "multiple layers of cardboard" means not only overlaying multiple pieces of cardboard, but also forming multiple layers by folding one or more pieces of cardboard, for example.

In the above-described first case, the case main body portion can includes: a first surface portion configured to face the first main surface; a second surface portion configured to face the second main surface; a first side surface portion configured to face the first side end surface; and a second side surface portion configured to face the second side end surface. The protruding portion may protrude from at least one of the first surface portion, the second surface portion, the first side surface portion, and the second side surface portion.

In the above-described first case, the protruding portion can include: a first protruding member that protrudes from the first surface portion; and a second protruding member that protrudes from the second surface portion.

According to this configuration, the case can be brought into contact with or hooked onto another member, on either surface on the first surface portion side and the second surface portion side.

Although the shape of the protruding portions is not particularly limited, for example, it can be formed into an octagonal shape as described below.

For example, in the above-described first case, the first protruding member can include: a first protruding surface that is parallel to the first surface portion; and a pair of first inclined surfaces that extend obliquely from both sides of the first protruding surface to the first side surface portion and the second side surface portion, and the second protruding member can include: a second protruding surface that is parallel to the second surface portion; and a pair of second inclined surfaces that extend obliquely from both sides of the second protruding surface to the first side surface portion and the second side surface portion.

In the above-described first case, a protruding height of the first protruding member from the first surface portion and a protruding height of the second protruding member from the second surface portion may be approximately the same.

In this manner, the heights of both protruding portions are the same, and therefore the protruding portions can similarly hook onto or come into contact with the other member.

In the above-described first case, at least part of the first operation portion can be configured to protrude to the outside from the first opening portion when the controller is accommodated in the accommodating space, at least one of the protruding portions can be provided on the first surface portion, and the protruding height of the protruding portion from the first surface portion can be greater than the protruding height of the first operation portion protruding from the first surface portion.

According to this configuration, the protruding height of the protruding portions is higher than the protruding height of the first operation portion, and therefore the protruding portions can hook onto or come into contact with the other member without the first operation portion interfering with the other member. Furthermore, the protruding first operation portion is disposed so as to be hidden by the protruding portion on the first end portion side, and therefore the first operation portion can be protected from collision with the other member and the like.

In the above-described first case, at least part of the third operation portion can be configured to protrude to the outside from the third opening portion when the controller is accommodated in the accommodating space, at least one of the protruding portions can be provided on the second surface portion, and the protruding height of the protruding portion from the second surface portion can be greater than the protruding height of the third operation portion protruding from the second surface portion.

According to this configuration, the protruding height of the protruding portions is higher than the protruding height of the third operation portion, and therefore the protruding portions can hook onto or come into contact with the other member without the third operation portion interfering with the other member. Furthermore, the protruding third operation portion is disposed so as to be hidden by the protruding portion on the first end portion side, and therefore the third operation portion can be protected from collision with the other member and the like.

The case main body portion can have various forms, and for example, the following configuration is possible.

In the above-described first case, the case main body portion can include: an accommodating portion that includes an insertion port into which the controller is to be inserted, and is for accommodating the controller in a state in which part of the first end surface side is exposed from the insertion port; and a lid portion to be connected to part of the accommodating portion so as to cover part of the first end surface side of the controller exposed from the accommodating portion. The lid portion can be configured to be able to enter a closed state in which the insertion port is closed, and an open state in which the insertion port is open and part of the first end surface side of the controller is exposed.

In this manner, due to the case main body portion being constituted by the accommodating portion and the lid portion, not the entire controller but a portion thereof in the longer direction is accommodated in the accommodating portion, whereafter the entire controller can be accommodated in the case main portion by closing the lid portion, and therefore the controller is easier to accommodate.

In the above-described first case, the case main body portion can include: a first surface portion configured to face the first main surface; a second surface portion configured to face the second main surface; a first side surface portion configured to face the first side end surface; and a second side surface portion configured to face the second side end surface. The accommodating portion can include: a first accommodating surface portion, which is part of the first surface portion; a second accommodating surface portion, which is part of the second surface portion; a first accommodating side surface portion, which is part of the first side surface portion; and a second accommodating side surface portion, which is part of the second side surface portion. The lid portion can include: a first lid surface portion, which is part of the first surface portion; a second lid surface portion, which is part of the second surface portion; a first lid side surface portion, which is part of the first side surface portion; and a second lid side surface portion, which is part of the second side surface portion. The first accommodating side surface portion and the first lid side surface portion can be connected integrally, and the lid portion can be configured to enter the open state by folding a boundary between the first accommodating side surface portion and the first lid side surface portion.

According to this configuration, the first accommodating side surface portion of the accommodating portion and the first lid side surface portion of the lid portion can be folded, and therefore the lid portion can be swung with respect to the accommodating portion using the folding portion as a hinge. Accordingly, the lid portion can be opened and closed easily with respect to the insertion port.

In the above-described first case, a protruding piece that protrudes from the second lid side surface portion can be provided, and the protruding piece can be configured to engage with an inner surface of the second accommodating side surface portion when the lid portion is in the closed state.

According to this configuration, when the lid portion is in the closed state, the protruding piece is configured to engage with the inner surface of the second accommodating side surface portion, and therefore when the lid is swung closed, the lid portion can be disposed at the correct position with respect to the accommodating portion as long as the protruding piece is engaged with the second accommodating side surface portion. That is, it is easy to position the lid portion with respect to the accommodating portion using the protruding piece.

In the above-described first case, a lock member that protrudes from the second accommodating side surface portion can be provided, the lock member can be configured to be able to fold with respect to the second accommodating side surface portion so as to be able to have a locked position of locking the lid member in the locked state and an unlocked position at which the lid member can move from the closed state to the open state, and the lock member can include a protrusion that can engage with an engaged portion formed on the lid portion when at the locked position.

According to this configuration, if the protrusion of the lock member extending from the accommodating portion is engaged with the engaged portion of the lid portion, the closed state of the lid portion can be held, and the lid portion can be prevented from opening unexpectedly. It should be noted that the engaged portion can be formed by a groove, a through hole, a bottomed hole, or the like, and if the locked state of the lock member can be maintained, the shape of the protrusion is not particularly limited.

In the above-described first case, the accommodating portion can be provided with at least one restricting portion for restricting the controller accommodated in the accommodating space from moving toward the second end portion.

With this configuration, the controller accommodated in the case main body can be prevented from moving toward the second end portion of the case main body portion, and therefore the controller can be prevented from coming out of the first opening portion of the second end portion.

In the above-described first case, the second accommodating side surface portion of the accommodating portion can be formed by overlaying a plurality of plate materials.

Accordingly, the restricting portion can be made stronger, and for example, even if the controller is strongly inserted into the case main body portion, the restricting portion can be prevented from being damaged. Furthermore, even if the controller is accommodated in the case main body portion repeatedly, the restricting portion can be prevented from being damaged.

The above-described first case can further include a movable member disposed at a position opposing the operation button included on the second operation portion when the controller is accommodated in the accommodating space. The movable member can include: a first region that can be operated by a user; and a second region that can press the operation button of the second operation portion in response to the operation on the first region when the controller is accommodated in the accommodating space.

According to this configuration, the movable member that can press the operation button of the second operation portion is provided on the case main body portion accommodating the controller, and therefore even when the controller is accommodated in the case, the user can operate the second operation portion.

The movable member can be attached to the case main body portion in various forms, and for example, the following configuration is possible.

That is, the above-described first case can further include a holding member attached to the first end portion side of the case main body portion. The holding member can have a through hole formed at a position opposing the operation button of the second operation portion when the controller is accommodated in the accommodating space, and the holding member can be configured to hold the movable member such that the first region of the movable member is exposed to the outside from the through hole.

In the above-described first case, the second region of the movable member can be configured to come into contact linearly with the operation button of the second operation portion.

Accordingly, when the operation button is pressed by the movable member, the force can be concentrated on the operation button. For this reason, the operation button can be operated without pressing with a strong force.

In the above-described first case, the second region of the movable member can be made of a plate material, and if the controller is accommodated in the accommodating space, the surface direction of the plate material and the pressing direction of the operation button of the second operation portion can be parallel.

Various embodiments are conceivable for the configuration in which the movable member is held in the case main body portion, and for example, the following configuration is possible.

In the above-described first case, a stopper portion for restricting the movable member from separating from the through hole and for restricting the movable member from moving toward the second end portion can be provided on the movable member.

In the above-described first case, the stopper portion can be configured to be covered by the protruding portion.

In this manner, by covering the stopper portion with the protruding portion, the appearance can be improved.

A second case is a case configured to accommodate a controller, the controller including: a first main surface; a second main surface provided on a side opposite to the first main surface; a first side surface and a second side surface provided on both ends in a longer direction of the first main surface and the second main surface; and a first side end surface and a second side end surface provided on both ends in a shorter direction of the first main surface and the second main surface. The controller further includes: a first operation portion provided on the first main surface; a second operation portion provided on the first end surface; a third operation portion provided on the second main surface; and an image capturing section provided on the second end surface. The case includes a case main body portion having an accommodating space that can accommodate the controller, at least a portion of the case main body portion being made of paperboard. The case main body portion includes: a first surface portion configured to face the first main surface; a second surface portion configured to face the second main surface; a first end portion configured to face the first end surface; a second end portion configured to face the second end surface; a first side surface portion configured to face the first side end surface; and a second side surface portion configured to face the second side end surface. The case main body portion is provided with: a first opening portion that is provided on the second end portion side and is for allowing image capture of the outside of the case main body portion by the image capturing section when the controller is accommodated in the accommodating space; a second opening portion from which at least part of the first operation portion is exposed when the controller is accommodated in the accommodating space; and a third opening portion from which at least part of the third operation portion is exposed when the controller is accommodated in the accommodating space.

According to this configuration, at least part of the case main body portion is made of paperboard, and therefore cutting and folding are easy. Accordingly, machining and assembly of the case main body portion can be performed easily, and convenience is improved. Note that the entire case main body portion need not be made of paperboard, and for example, part of the case main body portion may be made of a resin material.

The case main body portion can have various forms, and for example, the following configuration is possible.

In the above-described second case, the case main body portion can include: an accommodating portion that includes an insertion port into which the controller is to be inserted, and is for accommodating the controller in a state in which part of the first end surface side is exposed from the insertion port; and a lid portion to be connected to part of the accommodating portion so as to cover the controller exposed from the accommodating portion. The lid portion can be attached to the accommodating portion so as to be able to enter a closed state in which the insertion port is closed, and an open state in which the insertion port is open and part of the controller is exposed.

In this manner, due to the case main body portion being constituted by the accommodating portion and the lid portion, not the entire controller but a portion thereof in the longer direction is accommodated in the accommodating portion, and thereafter the entire controller can be accommodated in the case main portion by closing the lid portion, and therefore the controller is easier to accommodate.

In the above-described second case, the accommodating portion can include: a first accommodating surface portion, which is part of the first surface portion; a second accommodating surface portion, which is part of the second surface portion; a first accommodating side surface portion, which is part of the first side surface portion; and a second accommodating side surface portion, which is part of the second side surface portion. The lid portion can include: a first lid surface portion, which is part of the first surface portion; a second lid surface portion, which is part of the second surface portion; a first lid side surface portion, which is part of the first side surface portion; and a second lid side surface portion, which is part of the second side surface portion. The first accommodating side surface portion and the first lid side surface portion can be integrally connected, and the lid portion can be configured to enter the open state by folding a boundary between the first accommodating side surface portion and the first lid side surface portion.

According to this configuration, the first accommodating side surface portion of the accommodating portion and the first lid side surface portion of the lid portion are integrated, and therefore the lid portion can be swung with respect to the accommodating portion using the folding portion as a hinge. Accordingly, the lid portion can be opened and closed easily with respect to the insertion port.

In the above-described second case, a protruding piece that protrudes from the second lid side surface portion can be provided, and the protruding piece can be configured to engage with an inner surface of the second accommodating side surface portion when the lid portion is in the closed state.

According to this configuration, the protruding piece is configured to engage with the inner surface of the second accommodating side surface portion when the lid portion is in the closed state, and therefore when the lid is swung closed, the lid portion can be disposed at the correct position with respect to the accommodating portion as long as the protruding piece is engaged with the second accommodating side surface portion. That is, it is easy to position the lid portion with respect to the accommodating portion using the protruding piece.

In the above-described second case, a lock member that protrudes from the second accommodating side surface portion can be provided, the lock member can configured to be able to fold with respect to the second accommodating side surface portion so as to be able to have a locked position of locking the lid member in the locked state and an unlocked position at which the lid member can move from the closed state to the open state, and the lock member can include a protrusion that can engage with an engaged portion formed on the lid portion when at the locked position.

According to this configuration, if the protrusion of the lock member extending from the accommodating portion is engaged with the engaged portion of the lid portion, the closed state of the lid portion can be held, and the lid portion can be prevented from opening unexpectedly.

In the above-described second case, the lock member can be formed into a plate shape, and can be configured to come into contact with the second lid side surface portion when the protrusion is fit into the engaged portion, and a finger insertion portion for hooking the lock member with a finger can be formed on the second lid side surface portion of the lid portion.

Furthermore, in the above-described second case, the lock member is formed into a plate shape, the protrusion can be configured to come into contact with the second lid side surface portion when engaged with the engaged portion, and the finger insertion recessed portion formed so as to conform to part of the peripheral edge of the lock member can be formed on the second lid side surface portion of the lid portion.

Accordingly, the lock member can easily be hooked by a finger inserted into the finger insertion recessed portion, and therefore the lock portion can easily be folded to remove the protrusion from the engaged portion.

In the above-described second case, the accommodating portion can be provided with at least one restricting portion for restricting the controller accommodated in the accommodating space from moving toward the second end portion.

With this configuration, the controller accommodated in the case main body can be prevented from moving toward the second end portion of the case main body portion, and therefore the controller can be prevented from coming out of the first opening portion of the second end portion.

The restricting portion can have various forms, and for example, the following configuration is possible.

In the above-described second case, the restricting portion can be provided in the accommodating space in the accommodating portion and can be configured to come into contact with the second end surface of the controller. Note that the second end surface of the controller may be curved, for example, and the restricting portion need only be configured to come into contact with the second end surface including the curved portion.

In the above-described second case, the restricting portion can be made of a plurality of layers of a plate material.

Accordingly, the restricting portion can be made stronger, and for example, even if the controller is strongly inserted into the case main body portion, the restricting portion can be prevented from being damaged. Furthermore, even if the controller is accommodated in the case main body portion repeatedly, the restricting portion can be prevented from being damaged.

It should be noted that "multiple layers of a plate material" means that, for example, one or more plate materials are folded into several layers.

In the above-described second case, the first operation portion can include the analog stick that protrudes from the first main surface of the controller when the controller is accommodated in the accommodating space, and the analog stick can be configured to not come into contact with the inner edge of the second opening portion in a state in which the controller is restricted from moving toward the second end portion by the restricting portion.

The analog stick is operated so as to swing in the surface direction of the first main surface, and therefore by preventing the analog stick from coming into contact with the inner edge of the second opening portion, it is possible to prevent the analog stick itself or the inner edge of the second opening portion from being damaged. Furthermore, the operation of the analog stick is not hindered, and operation can be performed smoothly.

In the above-described second case, the second accommodating side surface of the accommodating portion can be formed by overlaying a plurality of layers of a plate material. Accordingly, the second accommodating side surface portion can be made stronger.

A third case is a case configured to accommodate a controller, the controller including: a first main surface; a second main surface provided on a side opposite to the first main surface; a first side surface and a second side surface provided on both ends in a longer direction of the first main surface and the second main surface; and a first side end surface and a second side end surface provided on both ends in a shorter direction of the first main surface and the second main surface. The controller further includes: a first operation portion provided on the first main surface; a second operation portion provided on the first end surface; a third operation portion provided on the second main surface; and an image capturing section provided on the second end surface. The case includes: a case main body portion having an accommodating space in which the controller can be accommodated; and a movable member that is disposed at a position opposing an operation button of the second operation portion when the controller is accommodated in the accommodating space. The case main body portion is formed into a lengthwise shape including: a first end portion configured to face the first end surface of the controller when the controller is accommodated in the accommodating space; and a second end portion configured to face the second end surface of the controller when the controller is accommodated in the accommodating space. The case main body portion is provided with: a first opening portion that is provided on the second end portion side and is for allowing image capture of the outside of the case main body portion by the image capturing section when the controller is accommodated in the accommodating space; a second opening portion from which at least part of the first operation portion is exposed when the controller is accommodated in the accommodating space; and a third opening portion from which at least part of the third operation portion is exposed when the controller is accommodated in the accommodating space. The movable member includes a first region that can be operated by a user, and a second region that can press an operation button of the second operation portion in response to the operation of the first region when the controller is accommodated in the accommodating space.

According to this configuration, the movable member that can press the operation button of the second operation portion is provided on the case main body portion accommodating the controller, and therefore even when the controller is accommodated in the case, the user can operate the second operation portion.

The movable member can be attached to the case main body portion in various forms, and for example, the following configuration is possible.

The above-described third case can further include a holding member attached to the first end portion side of the case main body portion, and the holding member can include a through hole formed at a position opposing the operation button of the second operation portion and can be configured to hold the movable member such that the first region of the movable member is exposed to the outside from the through hole.

In the above-described third case, the case main body portion can be provided with at least one restricting portion for restricting the accommodated controller from moving toward the second end portion side.

With this configuration, the controller accommodated in the case main body can be prevented from moving toward the second end portion of the case main body portion, and therefore the controller can be prevented from coming out of the first opening portion of the second end portion.

The restricting portion can have various forms, and for example, the following configuration is possible.

In the above-described third case, a first restricting portion, which is one of the restricting portions, is provided inside of the accommodating portion and can be configured to come into contact with the second end surface of the controller.

Also, in the third case, at least part of the third operation portion is configured to protrude from the third opening portion when the controller is accommodated in the accommodating space, and the second restricting portion, which is one of the restricting portions, can be constituted by the inner edge of the third opening portion, which engages with the third operation portion.

In the above-described third case, the second region of the movable member can be made of a plate material, and if the controller is accommodated in the accommodating space, the surface direction of the plate material and the pressing direction of the operation button of the second operation portion can be parallel.

According to this configuration, the second region can orthogonally come into contact with the operation button of the second operation portion, and therefore when the operation button is pressed, the second region can be prevented from warping. Accordingly, when the movable member is pressed, the force can be more reliably transmitted to the operation button. Note that "parallel" encompasses not only being completely parallel, but also a case of being slightly inclined.

In the above-described third case, the second region of the movable member can be configured to come into contact linearly with the operation button of the contact portion.

Accordingly, when the operation button is pressed by the movable member, the force can be concentrated on the operation button. For this reason, the operation button can be operated without pressing with a strong force.

Various embodiments are conceivable for the configuration in which the movable member is held in the case main body portion, and for example, the following configuration is possible.

In the third case, the movable member can be provided with a stopper portion for restricting the movable member from coming out of the through hole and for restricting the movable member from moving toward the second end portion.

The third case can further include a protruding portion that protrudes from the case main body portion, and the stopper portion can be configured to be covered by the protruding portion.

By providing the protruding portion in this manner, the above-described effects can be obtained. Also, by covering the stopper portion with the protruding portion, the appearance can be improved.

With the above-described case for a controller, convenience can be improved.

BRIEF DESCRIPTION OF THE DRAWINGS

FIG. 6 is a block diagram showing an example of an internal configuration of the main body apparatus shown in FIG. 1.

EMBODIMENTS OF THE INVENTION

Hereinafter, an embodiment of a controller case according to the present invention will be described with reference to the drawings. In the following description, first, a game controller accommodated in the cases and a game system including the game controller will be described, and thereafter the case will be described.

1. Overview of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

1-1. Main Body Apparatus

Figure 1:
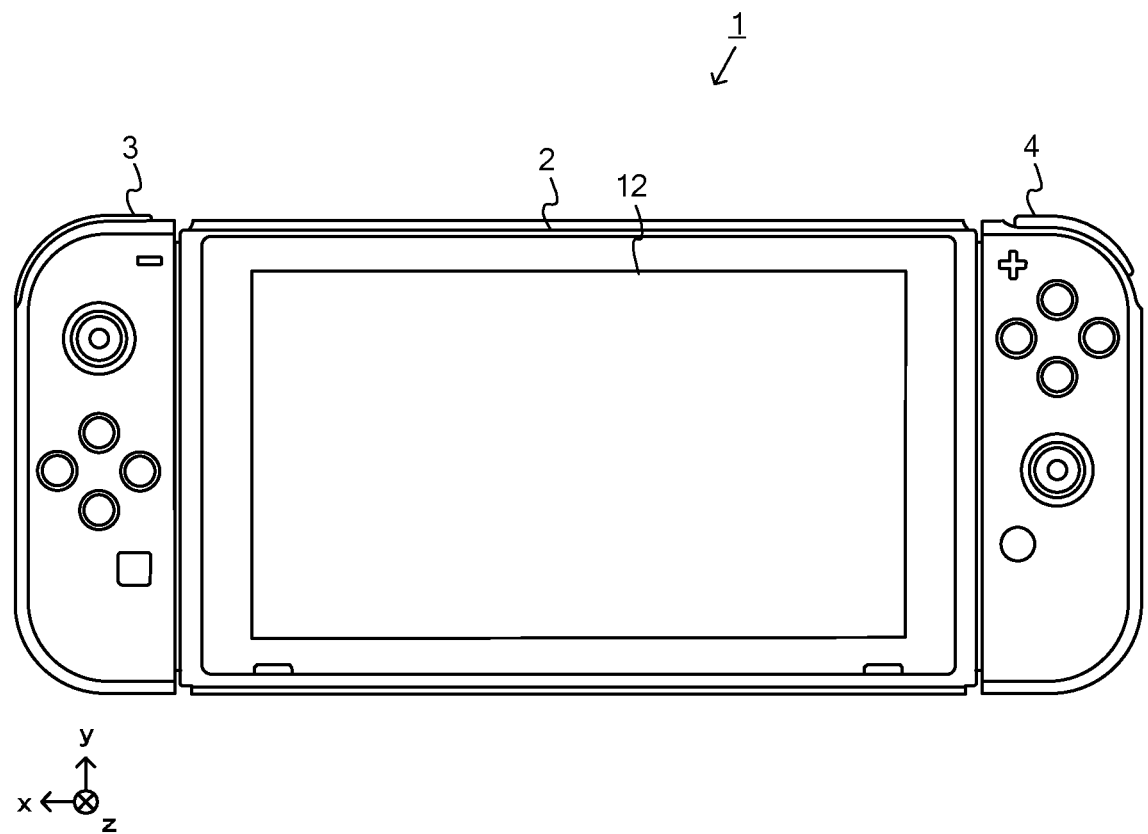
FIG. 1 is a diagram showing an example of a game system in a state in which a left controller and a right controller are attached to a main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of The left controller 3 and the right controller 4 is an apparatus including operation portions with which a user provides inputs.

Figure 2:
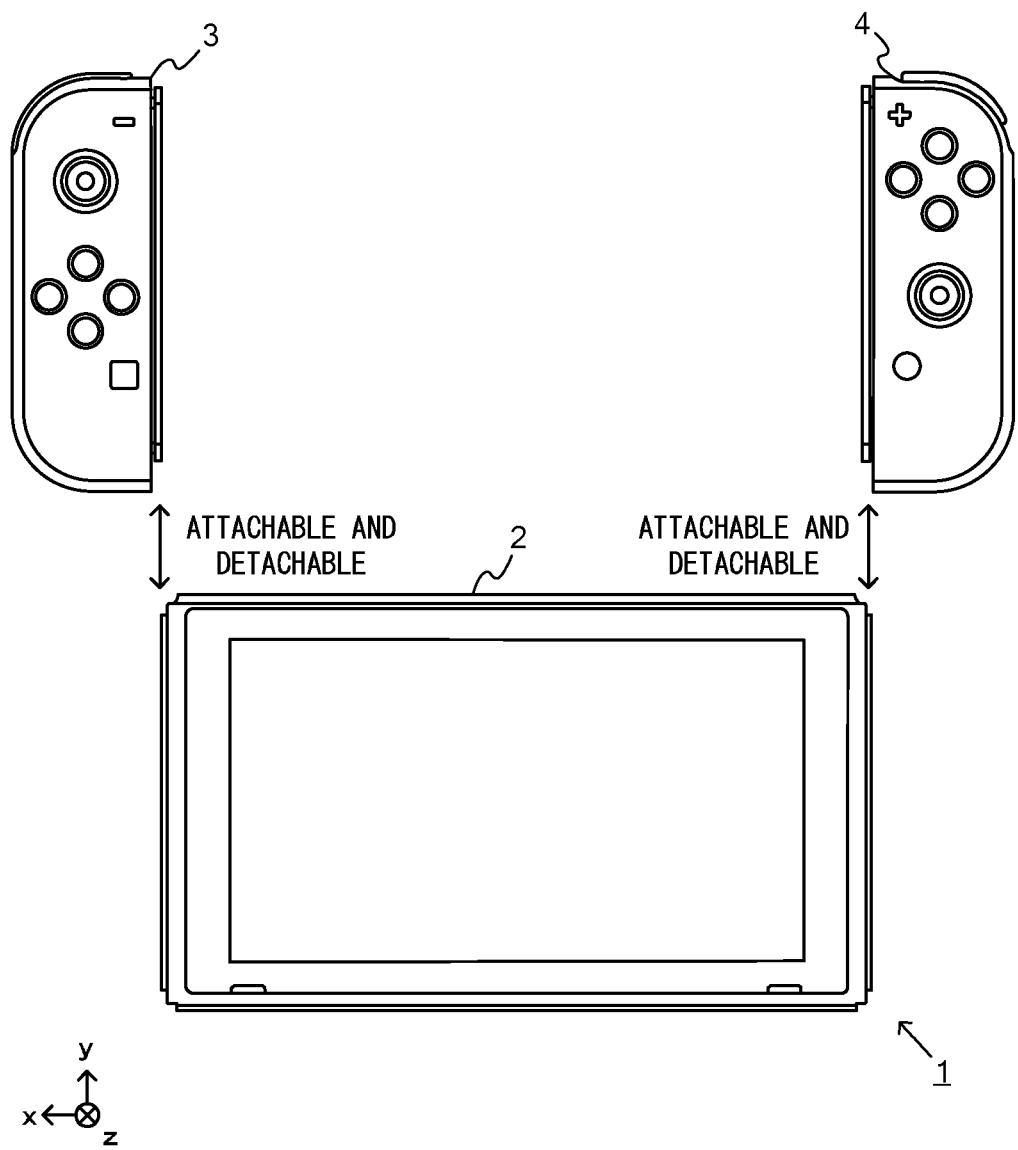
FIG. 2 is a diagram showing an example of a game system in a state in which the left controller and the right controller have been removed from the main body apparatus.

FIG. 2 is a diagram showing an example of the state where the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
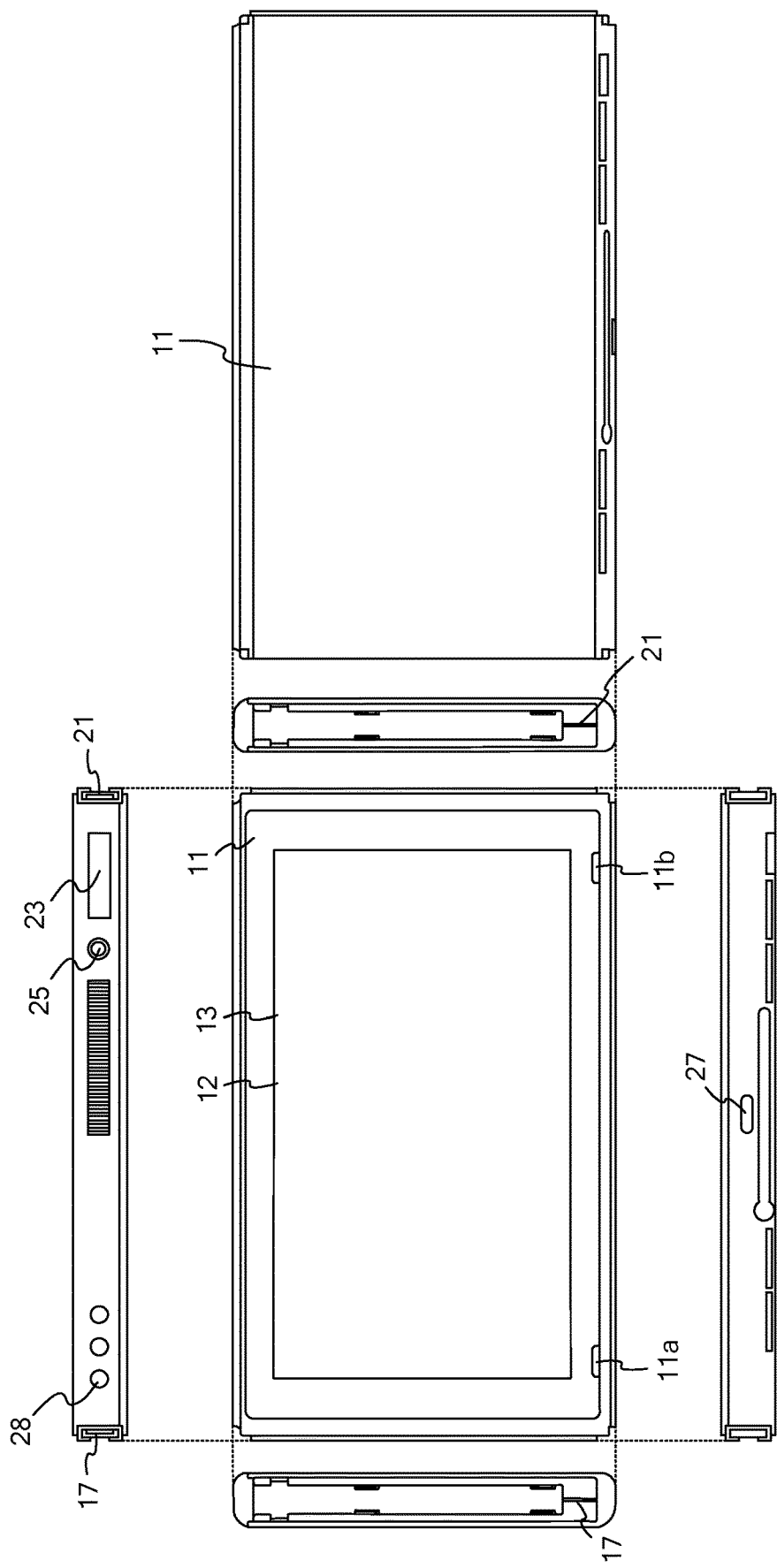
FIG. 3 shows six orthogonal views showing an example of the main body apparatus shown in FIG. 1.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes a speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to performs wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicates with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

1-2. Left Controller

Figure 4:
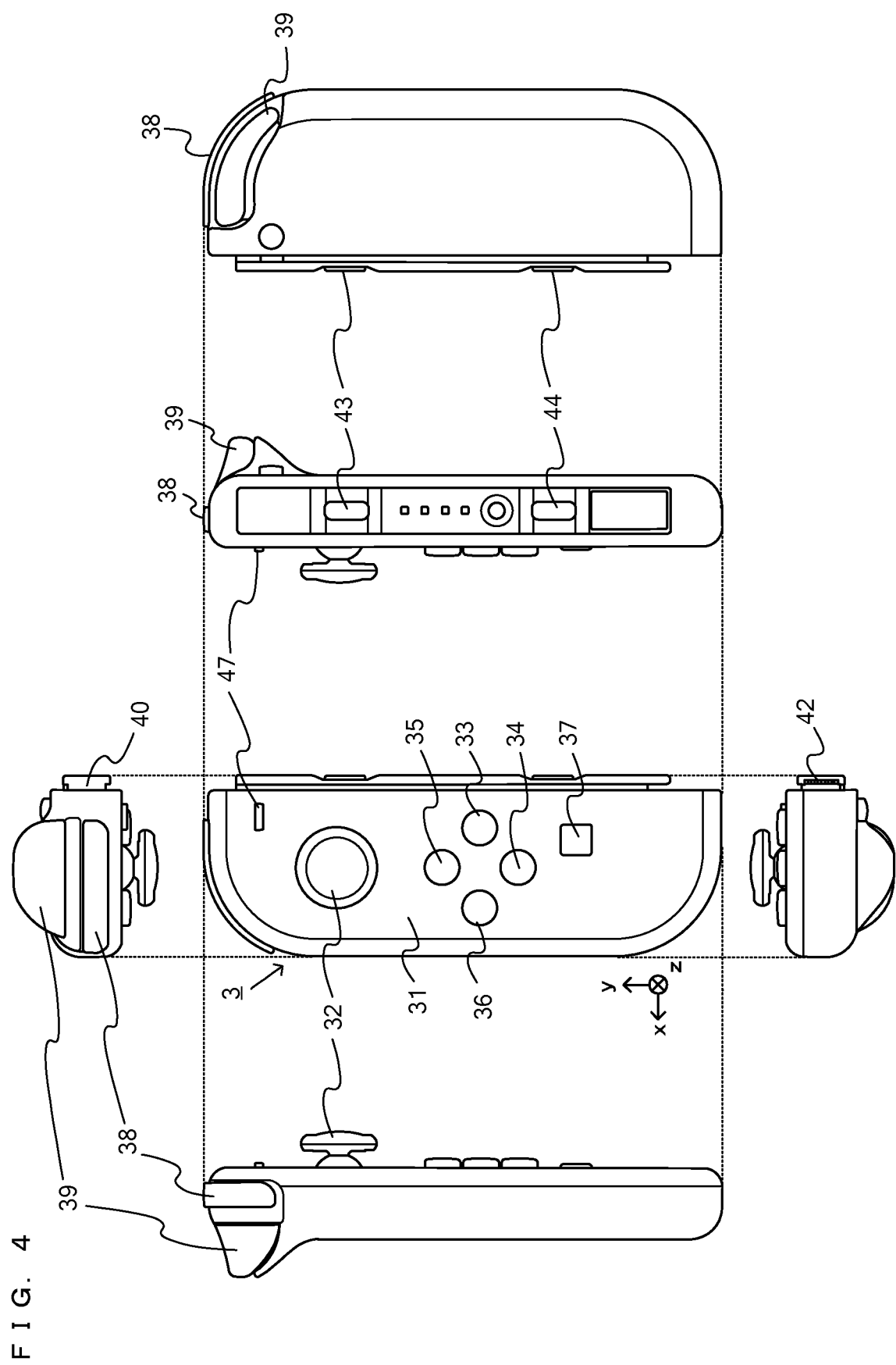
FIG. 4 shows six orthogonal views showing an example of the left controller shown in FIG. 1.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L button 38 and a ZL button 39 in an upper left portion of a side surface of the housing 31. Further, the left controller 3 includes a second L button 43 and a second R button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to performs wired communication with the main body apparatus 2.

1-3. Right Controller

Figure 5:
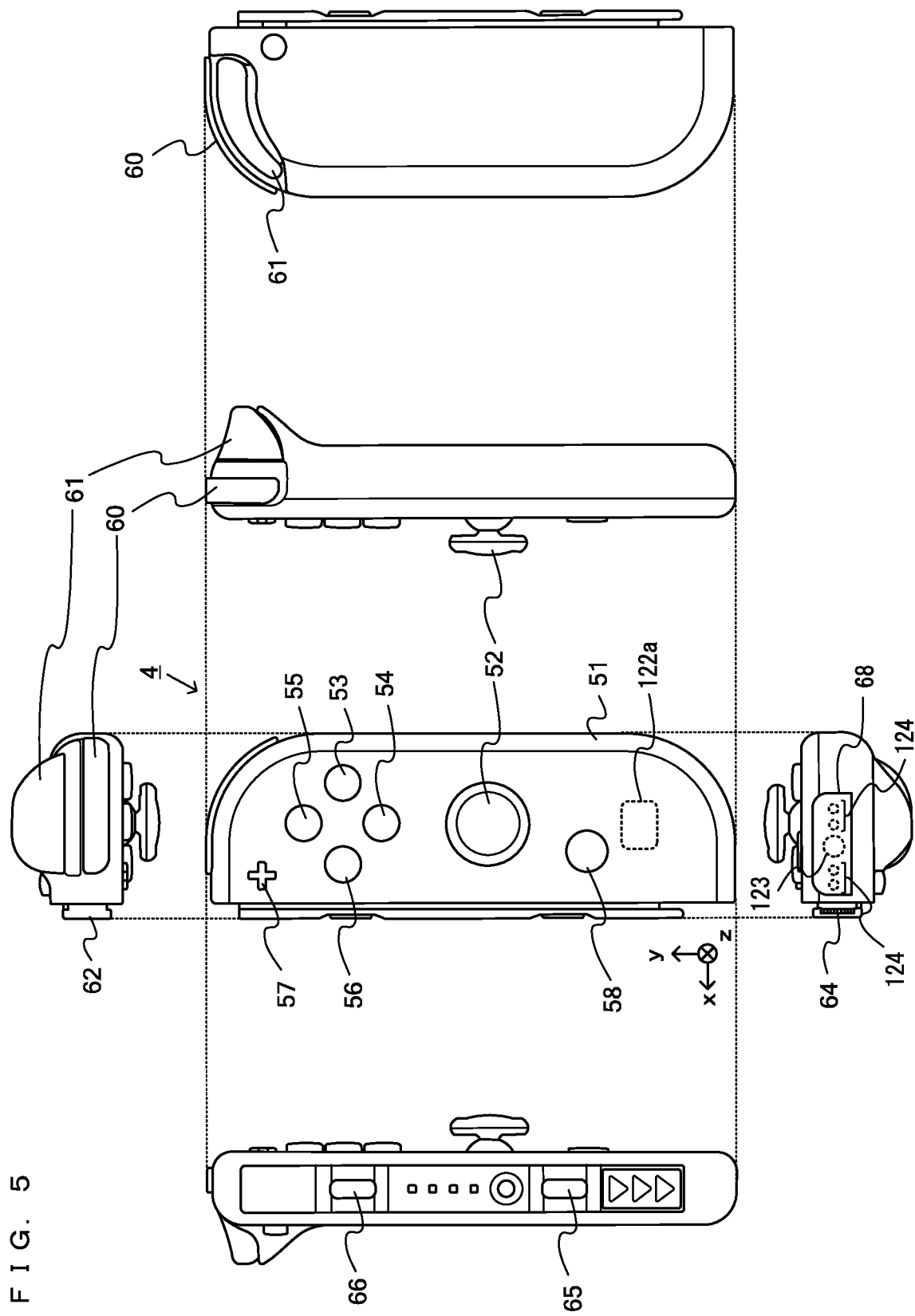
FIG. 5 shows six orthogonal views showing an example of the right controller shown in FIG. 1.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands. Here, for the sake of convenience in the description, it is assumed the outer surface of the housing 51 of the right controller 4 is defined as follows. That is, the housing 51 is formed in an approximate cuboid shape and includes a rectangular first main surface whose longer direction is the up-down direction, and a second main surface opposite thereto. Also, in the housing 51, the upper end surface in the longer direction of the main surfaces constitutes a first end surface, and the lower end surface constitutes a second end surface. Also, the right side surface in the shorter direction of the two main surfaces constitutes a first side end surface and the left side surface constitutes a second side end surface. Note that the first end surface has a flat surface that faces upward in the longer direction on the left end portion, but curves downward toward the right side and is connected to the upper end of the first side end surface. Also, as will be described later, a curved first R button 60 is disposed on the first end surface. Similarly, the second end surface has a flat surface that faces downward in the longer direction on the left end portion, but curves upward toward the right side and is connected to the lower end of the first side end surface.

Also, an infrared image capturing section 123 and an infrared light-emitting section 124, which will be described later, are arranged on the second end surface.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. The operation buttons 53 to 58 and the analog stick 32 provided on the first main surface of the right controller 4 are examples of first operation portions of the present invention. Also, the right controller 4 includes the curved first R button 60 on the first end surface of the housing 51. Also, a ZR button 61, which protrudes toward the rear surface and can be pressed from above is provided on the rear surface side of the first R button 60. Also, a bulging portion 500 is formed below the ZR button 61. The bulging portion 500 is a region that bulges from the second main surface and has an inclined surface that approaches the second main surface as the bottom is approached from the ZR button 61. Here, the first R button 60 is an example of a second operation portion of the present invention, and the ZR button 61 and the bulging portion 500 are examples of third operation portions. Further, similarly to the left controller 3, the right controller 4 includes a second L button 65 and a second R button 66.

Further, a window portion 68 is provided on the second end surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. The window portion 68 is used to protect a lens of a camera of the infrared image capturing section 123, a light emitter of the infrared light-emitting section 124, and the like and is composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the right controller 4 includes an NFC communication section 122. The NFC communication section 122 performs short-range wireless communication based on the NFC (Near Field Communication) standard. The NFC communication section 122 includes an antenna 122a, which is used for short-range wireless communication, and a circuit (e.g., an NFC chip) for generating a signal (a radio wave) to be sent from the antenna 122a. It should be noted that the NFC communication section 122 may perform short-range wireless communication through any proximity communication (or contactless communication), instead of performing short-range wireless communication based on the NFC standard. Here, the NFC standard can be used for proximity communication (contactless communication), and "may perform short-range wireless communication through any proximity communication (or contactless communication)" is intended to mean that short-range wireless communication may be performed through other proximity communication except for proximity communication based on the NFC standard.

Further, the right controller 4 includes a terminal 64 for the right controller 4 to perform wired communication with the main body apparatus 2.

1-4. Internal Configuration of Main Body Apparatus

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performings the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, and thereby performings the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide input to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

1-5. Internal Configuration of Controller

Figure 7:
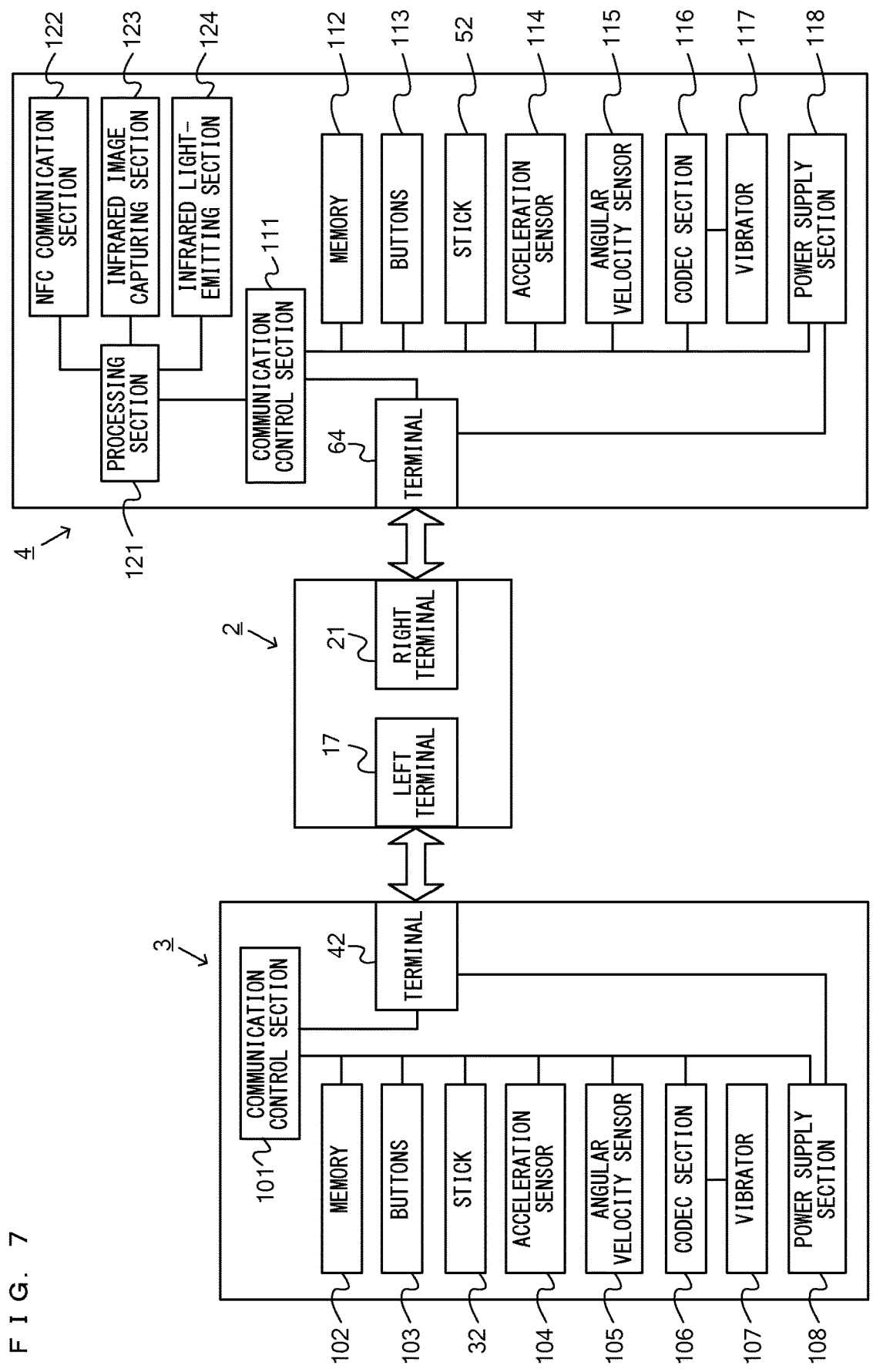
FIG. 7 is a block diagram showing an example of internal configurations of the main body apparatus, the left controller, and the right controller shown in FIG. 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of The acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the right controller 4) develops an electromotive force (e.g., by electromagnetic induction) in another device (here, a device near the antenna 122a). The other device can operate by the developed electromotive force, and may or may not have a power supply. When the right controller 4 (the antenna 122a) and a communication target come close to each other (typically, the distance between the right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the right controller 4 includes the infrared image capturing section 123 on the second end surface. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, the infrared image capturing section 123 includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the NFC communication section 122, the infrared image capturing section 123, and the infrared light-emitting section 124. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operations (specifically, reading, writing, and the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, from the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

2. Case

Next, a case 100 for accommodating the right controller 4 in the above-described game system will be described. Hereinafter, first, the exterior of the case 100 will be described, and thereafter parts constituting the case 100 will be described. Thereafter, an assembly method and a use method for the case 100 will be described.

2-1. Overview of Case

Figure 8:
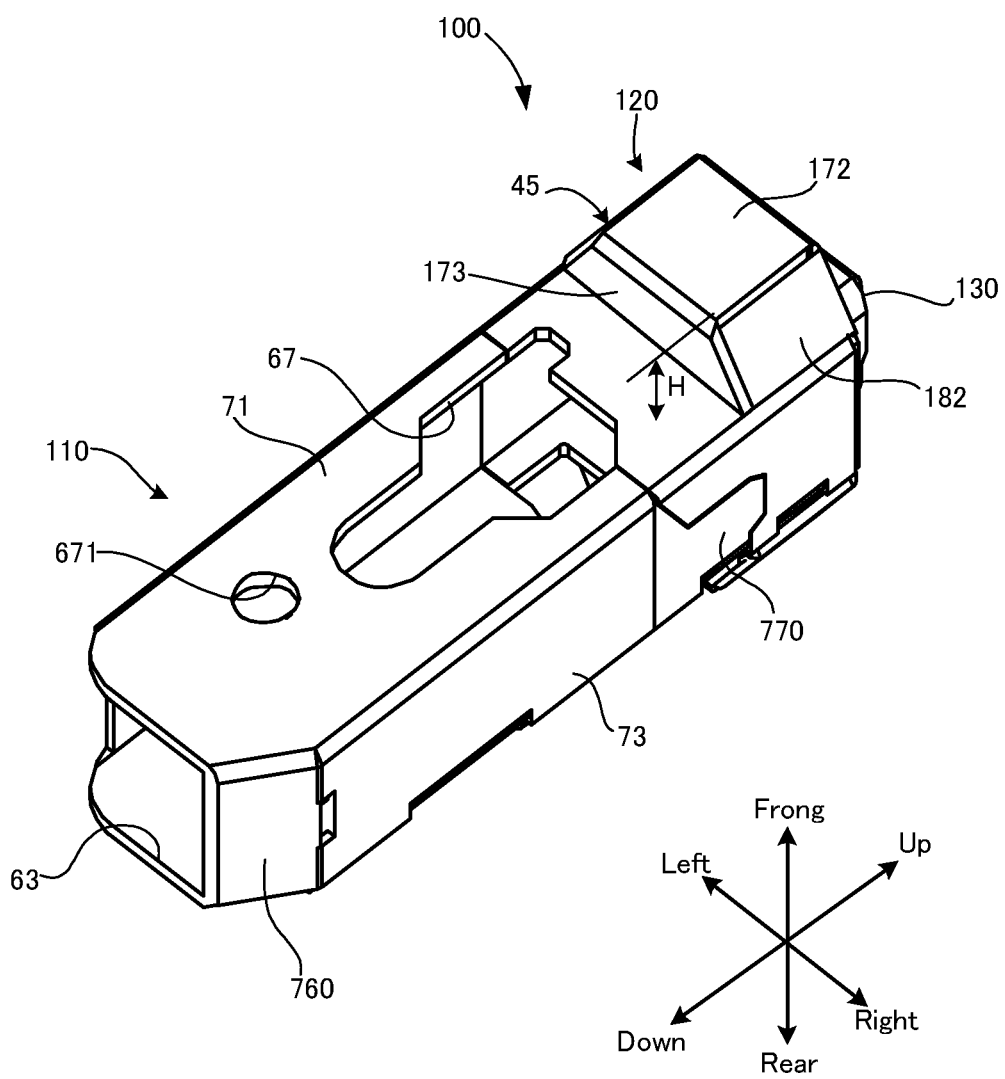
FIG. 8 is a perspective view of a case from a front side.
Figure 9:
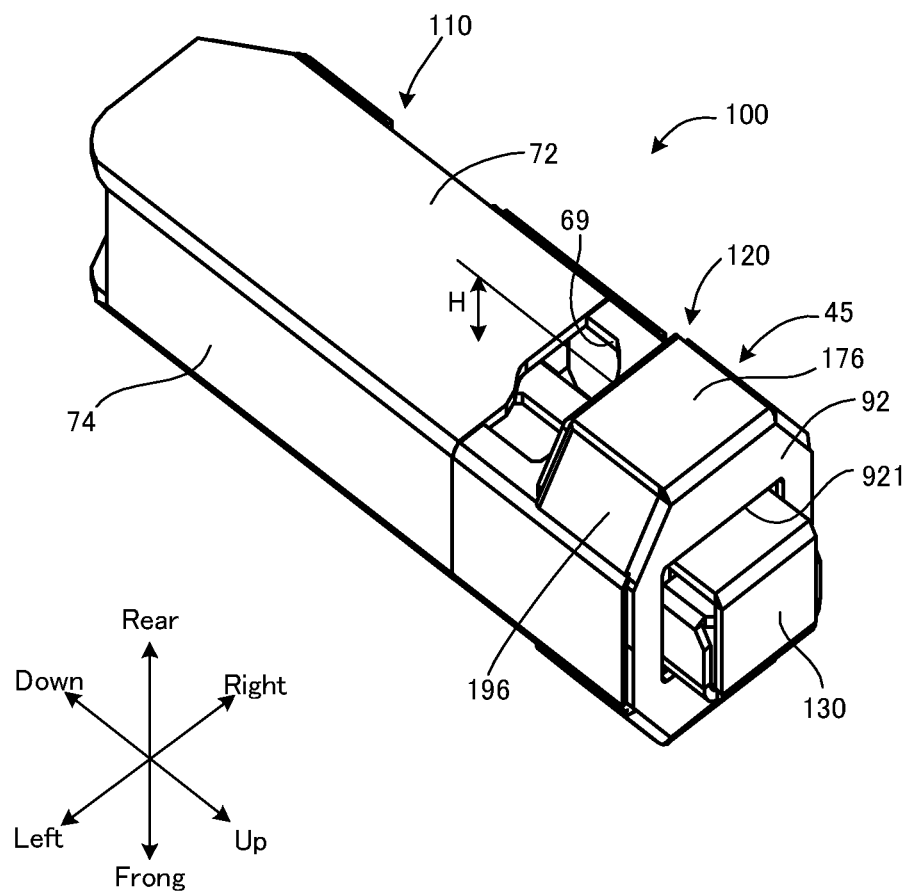
FIG. 9 is a perspective view of the case from a rear side.

FIG. 8 is a perspective view of the case viewed from a front side, and FIG. 9 is a perspective view of the case viewed from the rear side. Hereinafter, for the sake of convenience in the description, description will be given in accordance with the directions shown in FIGS. 8 and 9. As shown in FIGS. 8 and 9, the case 100 is made of cardboard, for example, and includes a case main body portion 110 with a cuboid shape that is elongated. Also, the cover member 120 and the movable member 130 are attached to the upper end portion in the longer direction of the case main body portion 110. It should be noted that the upper end portion of the case main body 110 corresponds to an example of a first end portion of the case main body portion according to the present invention, and the lower end portion of the case main body portion 110 corresponds to an example of the second end portion of the case main body portion according to the present invention.

As shown in FIGS. 8 and 9, the case main body portion 110 is formed into a cuboid shape as described above, and includes a rectangular front surface (first surface) 71 located on the upper side in FIG. 8, a rectangular rear surface (second surface) 72 located on the side opposite to the front surface 71, a right side surface (first side surface) 73 located on the right side of the front surface 71, and a left side surface (second side surface) 74 located on the left side of the front surface 71. Also, the right controller 4 is accommodated in the accommodation space surrounded by the surfaces 71 to 74. The cover member 120 is attached to the upper end portion of the case main body portion 110, and protruding portions 45 are formed near the upper end portions of the front surface 71 and the rear surface 72 of the case main body portion 110 by the cover member 120. The protruding portion (first protruding member) 45 on the front surface 71 side includes a rectangular protruding surface 172 parallel to the front surface 71, a pair of rectangular protruding side surfaces 182 and 186 (see FIG. 21) that extend obliquely from both sides toward the right side surface 73 and the left side surface 74, and the protruding portion 45 has a trapezoidal shape when viewed from the lower side (the second end portion side). Also, as shown in FIG. 9, the protruding portion (second protruding member) 45 on the rear surface 72 side is formed similarly. The upper surfaces of both protruding portions 45 and the upper portion of the case main body portion 110 are covered by a top plate portion 92, which is part of the cover member 120 and has an octagonal shape in plan view. Also, as shown in FIG. 8, the lower surfaces of the protruding portions 45 are also constituted by trapezoidal lower surface portions 173, which are parts of the cover member 120. Also, protruding heights H (height from the front surface 71 or the rear surface 72 to the highest portion) of the protruding portions 45 protruding from the front surface 71 and the rear surface 72 of the case main body portion 110 are formed to be the same.

The movable member 130 is formed into a cuboid shape and protrudes from a rectangular through hole 921 formed in a later-described top plate portion 92. Also, when the movable member 130 is pressed, the first R button 60 of the right controller 4 contained in the case 100 can be pressed.

As shown in FIG. 8, a first opening 63 is formed on the lower end portion of the case main body portion 110, and the infrared image capturing section 123 of the right controller 4 is exposed from the first opening portion 63. The infrared light-emitting section 124 is also exposed from the first opening portion 63. Moreover, a second large opening portion 67 from which the buttons and analog stick provided on the first main surface of the right controller 4 are exposed, and a second small opening portion 671 from which the home button 58 is exposed, are formed on the front end 71 of the case main body portion 110. Also, as shown in FIG. 9, a third opening portion 69 from which at least part of the ZR button 61 provided on the first end surface of the right controller 4 and at least part of a bulging portion 611 arranged therebelow are exposed is formed on the rear surface of the case main body portion 110.

Figure 10:
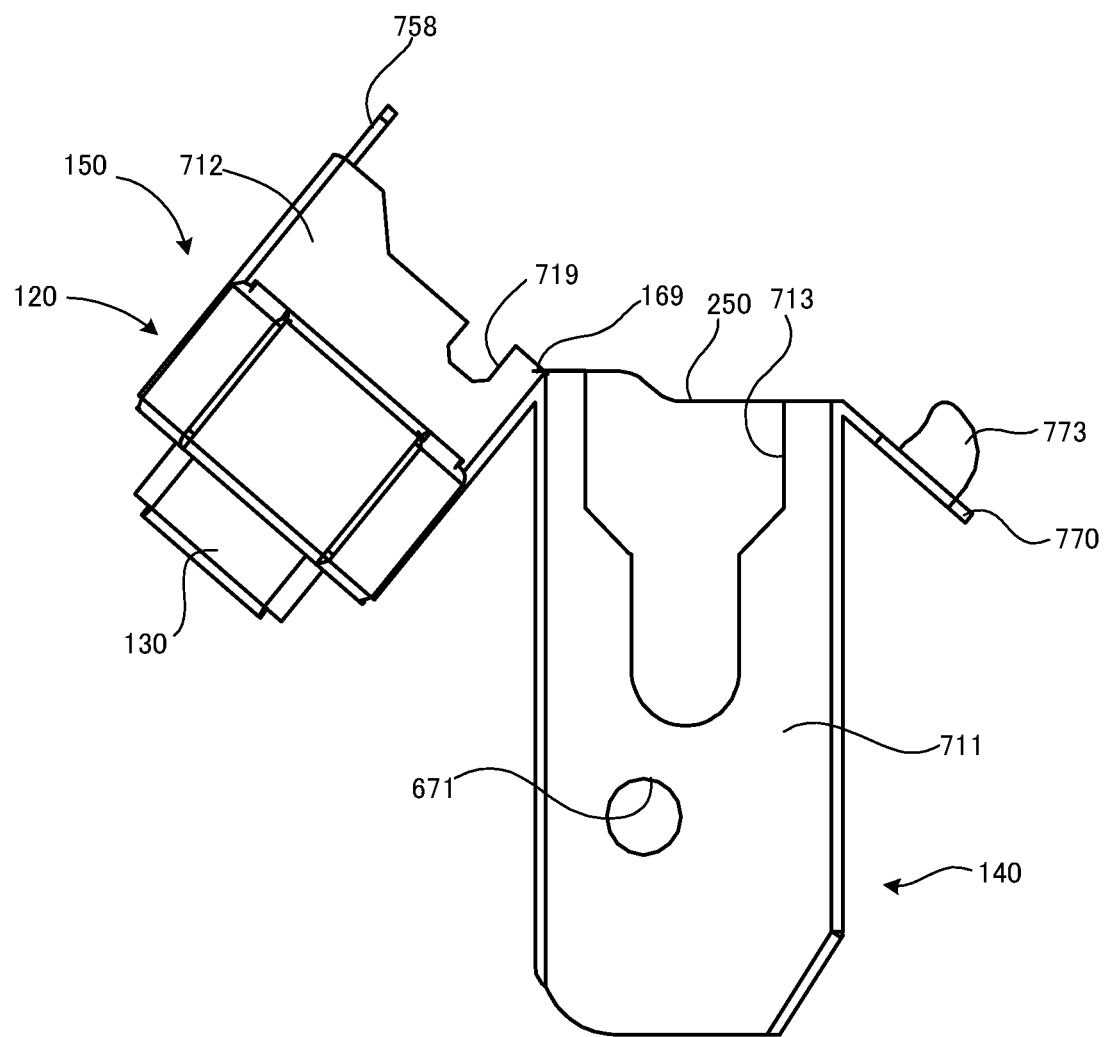
FIG. 10 is a view of a case main body portion.

As shown in FIG. 10, the case main body portion 110 is constituted by two parts, that is, the accommodating portion 140 and the lid portion 150 in order to accommodate the right controller 4. That is, the case main body portion 110 is divided into the accommodating portion 140 and the lid portion 150 at a position located slightly upward with respect to the center in the vertical direction. The accommodating portion 140 includes an insertion port 250 on its upper end, and as will be described later, most of the right controller 4 inserted through the insertion port 250 is accommodated in the accommodating portion 140 in a state in which part of the upper end portion of the right controller 4 is exposed. On the other hand, the lid portion 150 is disposed so as to cover the exposed upper end portion of the right controller 4 and close the insertion port 250 of the accommodating portion 140. Also, the above-described cover member 120 and the movable member 130 are attached to the lid portion 150. Also, the accommodating portion 140 and the lid portion 150 are connected on the left side surface 74 of the case main body portion 110, and the lid portion 150 can swing with respect to the accommodating portion 140 using this portion as a hinge 169. This makes it possible for the lid portion 150 to move between a closed state in which the insertion port 250 of the accommodating portion 140 is closed and an open state in which the insertion port 250 is open.

2-2. Constituent Components of Case and Assembly of Case

Next, constituent components of the case 100 will be described. As described above, the case 100 is formed by assembling the case main body portion 110 made of cardboard, the cover member 120, and the movable member 130. Hereinafter, the members will be described in detail with reference to the development views, and thereafter assembly of the case will be described.

2-2-1. Case Main Body

Figure 11:
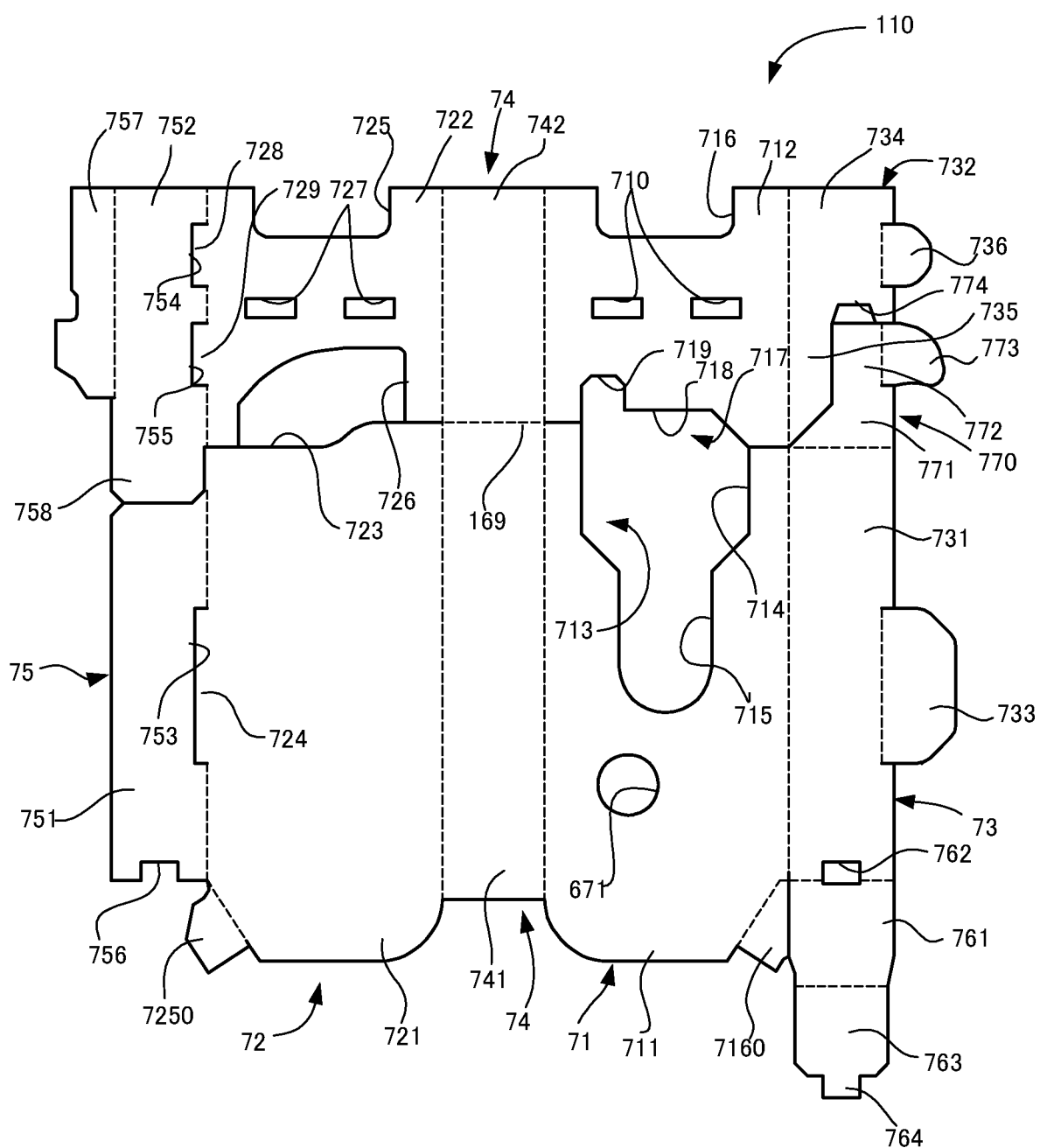
FIG. 11 is a development view of a case main body portion.

FIG. 11 is a development view of the case main body portion. In FIG. 11, the solid lines drawn inside of the case main body portion 110 indicate cutting lines, and the broken lines indicate folding lines. The same applies to all of the development views described in the present embodiment. Also, the case main body portion 110 is formed integrally using one sheet of cardboard.

As shown in FIG. 11, the case main body portion 110 includes the right side surface 73, the front surface 71, the left side surface 74, the rear surface 72, and a reinforcing surface 75, which are arranged side by side from right to left, and these surfaces are connected so as to be able to fold via the folding lines.

As described above, the case main body portion 110 is divided into the accommodating portion 140 and the lid portion 150, but the portions corresponding to the accommodating portion 140 in the right side member 73, the front surface 71, the left side surface 74, the rear surface 72, and the reinforcing surface 75 are referred to as "first right side surface portion 731", "first front surface portion 711", "first left side surface portion 741", "first rear surface portion 721", and "first reinforcing portion 751". On the other hand, the portions corresponding to the lid portion 150 are referred to as "second right side surface portion 732", "second front surface portion 712", "second left side surface portion 742", "second rear surface portion 722", and "second reinforcing portion 752".

First, the right side surface 73 will be described. The right side surface 73 is a portion that covers the right side end surface of the right controller 4, and as described above, is constituted by the first right side surface portion 731 and the second right side surface portion 732, which are arranged side by side in the up-down direction, as described above. A first insertion piece 733 that protrudes rightward is foldably connected near the center of the side edge on the right side of the first right side surface portion 731. Also, a rectangular corner member 761 constituting the lower right corner portion of the case main body portion 110 is foldably connected to the lower end of the first right side surface portion 731. Also, a rectangular engagement hole 762 is formed next to the folding line at the boundary between the corner member 761 and the first right side surface portion 731. Also, a reinforcing plate 763 is connected to the leading end portion of the corner member 761 via multiple folding lines, and the leading end of the reinforcing plate 763 is provided with an engaging protrusion 764 that can engage with the above-described engagement hole 762.

On the other hand, a fixing piece (locking member) 770 is foldably connected to the upper end of the first right side surface portion 731. The fixing piece 770 includes a trapezoidal first region 771 foldably connected to the upper end of the first right side surface portion 731 and a rectangular second region 772 extending upward from the right side of the upper edge of the first region 771, and these are formed integrally. Also, a protrusion 773 that protrudes rightward is foldably connected to the right side edge of the second region 772. As shown in FIGS. 8 and 10, the fixing piece 770 is a region that extends upward from the insertion port 250 of the accommodating portion 140 and constitutes the right side surface 73 of the lid portion 150, and the fixing piece 770 is a member for locking the lid portion 150 in the closed state. Also, the protrusion 773 folded from the fixing piece 770 is inserted into a later-described third insertion hole 755, whereby the fixing piece 770 is fixed to the lid portion 150.

Next, the second right side surface portion 732 will be described. The second right side surface portion 732 includes a rectangular base portion 734 disposed on the upper side of the second region 772 of the fixing piece 770, and an extending portion 735 that extends downward from the left side of the lower end of the base portion 734. The extending portion 735 is arranged so as to be side by side with the left side of the second region 772 of the fixing piece 770. Also, the base portion 734 and the extending portion 735 are formed integrally, and are foldably connected to the right side edge of the later-described second front surface portion 712. Also, a recessed portion 774 is formed on the lower edge of the base portion 734 and a finger insertion hole (recessed portion for finger insertion) into which a finger can be hooked is constituted by the recessed portion 774 and the fixing piece 770. Also, the second insertion piece 736 extending rightward is foldably connected to the right side edge of the base portion 734.

Next, the front surface 71 will be described. The front surface 71 is a portion covering the first main surface of the right controller 4, and as described above, the front surface 71 is constituted by the first front surface portion 711 and the second front surface portion 712, which are arranged side by side in the up-down direction. A first cutout 713 that is open upward is formed on the upper end of the first front surface portion 711, and forms part of the above-described second large opening 67. The first cutout 713 is formed by connecting a first region 714, which has a large width, and a second region 715, which has a small width, in the up-down direction. The first region 714 is a rectangular region that extends downward from the upper end of the first front surface portion 711, and is a region from which the four operation buttons 53 to 56 of the right controller 4 are exposed to the outside.

On the other hand, the second region 715 is formed into a rectangular shape that extends downward from the first region 714, and its lower end portion is formed into a circular arc shape. Also, from the second region 715, the analog stick 52 of the right controller 4 is exposed to the outside. Also, a circular through hole constituting the above-described second small opening portion 671 is formed below the second region 715, and the home button 58 of the controller 4 is exposed from the second small opening portion 671.

Also, a triangular first reinforcing corner portion 7160 is connected to the corner portion of the lower right end of the first front surface portion 711, via a folding line extending diagonally. This folding line extends toward the left as the bottom is approached from the top.

Next, the second front surface portion 712 will be described. The second front surface portion 712 is formed into a rectangular shape, and a rectangular second cutout 716 is formed on its upper end portion. The second cutout 716 is open upward and is used to attach the later-described movable member 130. On the other hand, a third cutout 717 that is open downward is formed on the lower end of the second front surface portion 712, and the second large opening portion 67 is constituted by the third cutout 717 and the first cutout 713 of the first front surface portion 711. The third cutout 717 is constituted by a trapezoidal first region 718 and a second region 719 that protrudes upward from the left end portion of the first region 718. The first region 718 is a portion connected to the upper end of the first cutout 713, and the second region 719 is a region from which the plus button 57 of the right controller 4 is exposed.

Also, two attachment holes 710 arranged side by side in the left-right direction are formed near the center in the up-down direction of the second front surface portion 712. The attachment holes 710 are formed into square shapes, penetrate through the second front surface portion 712, and are used to attach the later-described cover member 120.

Next, the left side surface 74 will be described. The left side surface 74 is a portion with a narrow width that covers the left side end surface of the right controller 4, and as described above, is constituted by the first left side surface portion 741 and the second left side surface portion 742 arranged side by side in the up-down direction. The first left side surface portion 741 and the second left side surface portion 742 are both formed into rectangular shapes, and the upper edge of the first left side surface portion 741 and the lower edge of the second left side surface portion 742 are foldably connected. That is, as described above, the connecting portion constitutes the hinge 169, which allows the lid portion 150 to swing with respect to the accommodating portion 140. Also, the length in the up-down direction of the first left side surface portion 741 is slightly shorter than those of the first front surface portion 711 and the first rear surface portion 721, and the first front surface portion 711 and the first rear surface portion 721 protrude slightly downward with respect to the left side surface portion 74.

Next, the rear surface 72 will be described. The rear surface 72 is a portion covering the second main surface of the right controller 4, and as described above, the rear surface 72 is constituted by the first rear surface portion 721 and the second rear surface portion 722, which are arranged side by side in the up-down direction. The upper edge 723 of the first rear surface portion 721 is formed into a shape that conforms to the bulging portion 500 of the right controller 4. That is, the upper edge 723 is constituted by connecting a linear edge portion that extends in the left-right direction from the boundary of the left side surface 74 to the reinforcing surface 75, a short, inclined edge portion that extends downward, and a linear edge portion that extends from the inclined edge portion to the boundary of the reinforcing surface 75.

A rectangular protruding portion 724 that slightly protrudes toward the first reinforcing portion 751 is formed near the center of the right side edge of the first rear surface portion 721, that is, the boundary of the first reinforcing portion 751. On the other hand, a recessed portion 753 is formed in the first reinforcing portion 751 so as to correspond to the protruding portion 724, and the boundary between the protruding portion 724 and the recessed portion 753 are constituted by cutting lines. For this reason, when the boundary between the first rear surface portion 721 and the first reinforcing portion 751 is folded, a through hole is formed at the portion corresponding to the recessed portion 753. The through hole constitutes the first insertion hole 753 into which the later-described first insertion piece 733 is to be inserted.

Also, a trapezoidal second reinforcing corner portion 7250 is connected to the corner portion on the lower left end of the first rear surface portion 721, via a folding line that extends obliquely. This folding line extends toward the right as the bottom is approached from the top.

Next, the second rear surface portion 722 will be described. The second rear surface portion 722 is formed into a rectangular shape, and a rectangular fourth cutout 725 is formed on its upper end portion. The fourth cutout 725 is open upward and is used to attach the later-described movable member 130. On the other hand, a fifth cutout 726 that is open downward is formed on the lower edge of the second rear surface portion 722. The fifth cutout 726 is formed into a trapezoidal shape and constitutes the third opening portion 69 with the upper edge 723 of the first rear surface portion 721. Also, the ZR button 61 and the bulging portion 500 of the right controller 4 are exposed from the third opening portion 69.

Also, two attachment holes 727 arranged side by side in the left-right direction are formed near the center in the up-down direction of the second rear surface portion 722. The attachment holes 727 are formed into rectangular shapes, penetrate through the second rear surface portion 722, and are used to attach the later-described cover member 120.

Two rectangular protruding portions 728 and 729 that slightly protrude toward the second reinforcing portion 752 are formed in the up-down direction at the right side edge of the second rear surface portion 722, that is, the boundary of the second reinforcing portion 752. On the other hand, two recessed portions 754 and 755 are formed in the second reinforcing portion 752 so as to correspond to the protruding portions 728 and 729, and the boundaries between the protruding portions 728 and 729 and the recessed portions 754 and 755 are constituted by cutting lines. For this reason, when the boundary between the first rear surface portion 722 and the second reinforcing portion 752 is folded, a through hole is formed at the portion corresponding to the recessed portions 754 and 755. These through holes constitute the second insertion hole 754 and the third insertion hole 755 into which the above-described second insertion piece 736 and the protrusion 773 are to be inserted.

Next, the reinforcing surface 75 will be described. As described above, the reinforcing surface 75 includes a first reinforcing portion 751 and a second reinforcing portion 752, which are arranged in the up-down direction. Note that the second reinforcing portion 752 protrudes downward with respect to the second front surface portion 712 and the second rear surface portion 722, and thus the length in the up-down direction of the first reinforcing portion 751 is shorter by that amount. The portion that protrudes downward on the second reinforcing portion 752 constitutes a protruding piece 758 for positioning that extends downward from the lower portion opening of the lid portion 150. Also, as described above, a recessed portion (first insertion hole) 753 is formed in the right side edge of the first reinforcing portion 751, and a recessed portion 756 is formed on the lower edge of the first reinforcing portion 751. The recessed portion 756 is constituted so as to correspond to the engagement hole 762 formed in the above-described first right side surface portion 731.

As described above, a recessed portion (second insertion hole) 754 and a recessed portion (third insertion hole) 755 are formed on the right side edge of the second reinforcing portion 752. Moreover, a plate-shaped assisting plate 757 is foldably connected to the left side edge of the second reinforcing portion 752.

Figure 12:
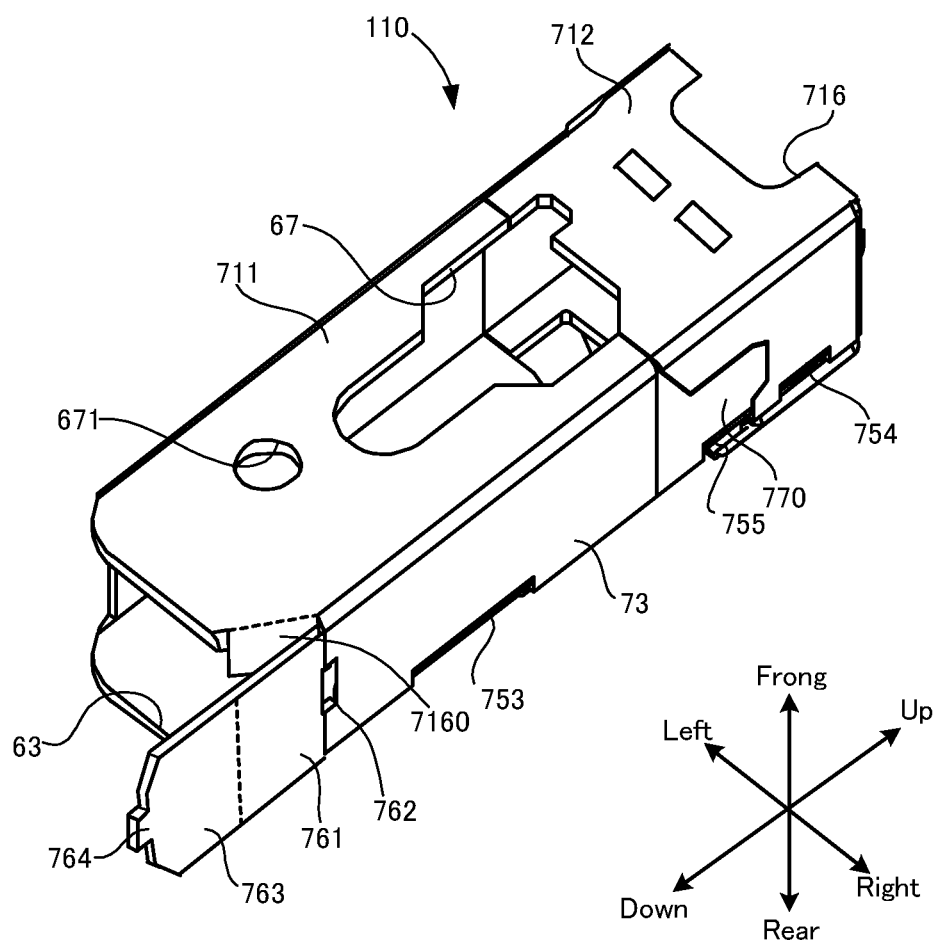
FIG. 12 is a perspective view for illustrating assembly of the case main body portion.
Figure 13:
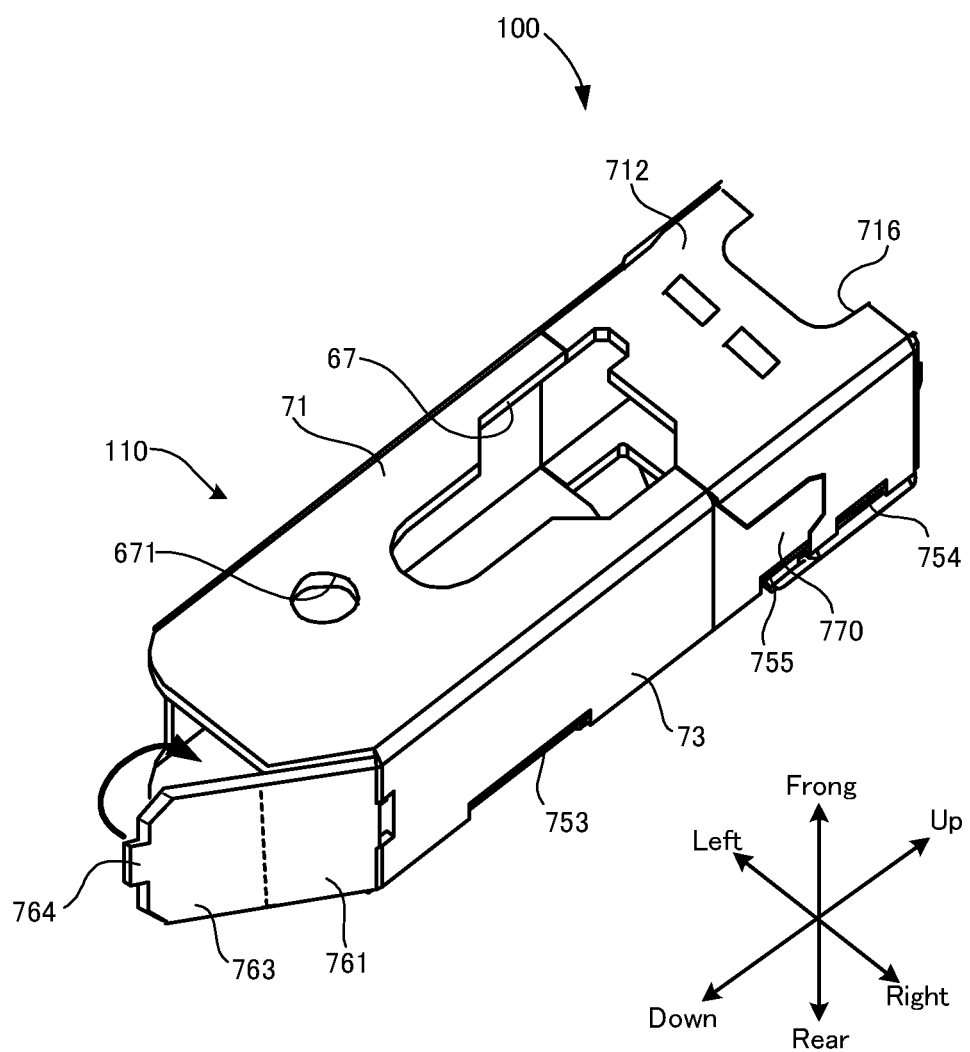
FIG. 13 is a perspective view for illustrating assembly of the case main body portion.

Next, assembly of the case main body portion 110 will be described with reference to FIGS. 12 and 13 as well. FIGS. 12 and 13 are schematic views illustrating assembly of the case main body portion. First, the folding lines connecting the right side surface 73, the front surface 71, the left side surface 74, the rear surface 72, and the reinforcing surface 75 are folded to form the polygonal tube as shown in FIG. 12. At this time, the reinforcing surface 75 is overlaid inside of the right side surface 73, and the first insertion piece 733 of the first right side surface portion 731, the second insertion piece 736 of the second right side surface portion 732, and the protrusion 773 are inserted into the first insertion hole 753 of the first reinforcing portion 751, the second insertion hole 754 of the second reinforcing portion 752, and the third insertion hole 755, respectively. Accordingly, the case main body portion 110 is held in a polygonal tube shape so as to not unfold. At this time, an upper portion opening and a lower portion opening that pass through the inner space are formed on the upper end portion and the lower end portion, respectively, of the case main body portion 110. Note that the assisting plate 757 provided on the second reinforcing portion 752 is folded and overlaid inside of the second front surface portion 712. Since the reinforcing surface 75 is overlaid in this manner on the right side surface 73 of the case main body portion 110, the reinforcing surface 75 is fixed thereto.

Next, the first reinforcing corner portion 7160 and the second reinforcing corner portion 7250 are folded, and as shown in FIG. 13, the corner member 761 of the lower end portion of the first right side surface portion 731 is overlaid on the outer surfaces (surfaces facing the outside of the case main body portion 110) of the first reinforcing corner portion 7160 and the second reinforcing corner portion 7250. Next, the reinforcing plate 763 is folded and overlaid on the rear surfaces (surfaces facing the inside of the case main body portion 110) of the first reinforcing corner portion 7160 and the second reinforcing corner portion 7250, and the engaging protruding portion 764 on the leading end is engaged with the above-described engagement hole 762. Accordingly, as shown in FIG. 8, a restricting plate 760 that is obliquely inclined is formed on the lower right corner portion of the case main body portion 110. The restricting plate 760 narrows the first opening portion 63 of the case main body portion 110, and as will be described later, prevents the right controller 4 from falling out of the case main body portion 110. That is, the restricting plate 760 is a member that restricts downward movement of the right controller 4. Also, the restricting plate 760 is formed by overlaying multiple plate materials 761, 763, 7160, and 7250, and therefore it is strong and its strength is prevented from decreasing due to long-term use.

2-2-2. Movable Member

Figure 14:
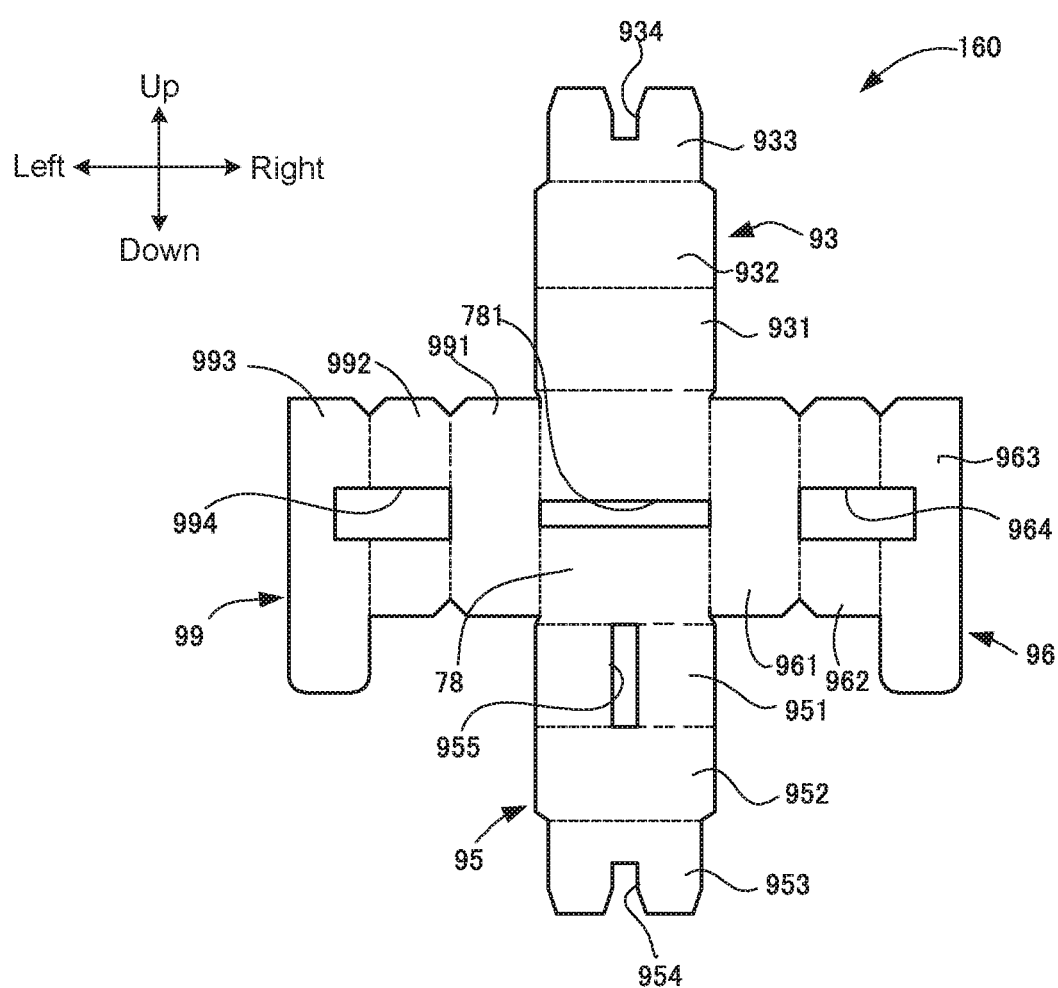
FIG. 14 is a development view of a movable member main body.

Next, the movable member 130 will be described. The movable member 130 is formed by two members. That is, the movable member 130 is constituted by a movable member main body 160 and a stopper portion 170. First, the movable member main body 160 will be described with reference to FIG. 14. FIG. 14 is a development view of the movable member main body. Note that the movable member main body 160 is also formed integrally using one sheet of cardboard.

As shown in FIG. 14, the movable member main body 160 includes a rectangular central portion 78, an upper member 93 and lower member 95 connected to the upper and lower peripheries of the central portions 78, and a right member 96 and left member 99 foldably connected to the left and right peripheries of the central portions 78, and these are formed integrally. A slit-shaped first through hole 781 that extends in the left-right direction is formed near the center in the up-down direction of the central portion 78. The upper member 93 includes a first region 931, a second region 932, and a third region 933 that are arranged side by side upward from the upper periphery of central portion 78, and are foldably connected to each other. The first and second regions 931 and 932 are formed into rectangular shapes, but a cutout 934 is formed in the center in the left-right direction of the third region 933.

The lower member 95 is located on the other side of the central portion 78 and has a shape that is symmetrical to the upper member 93 on the lower side, and therefore detailed description thereof is omitted. Note that a slit 955 that extends in the up-down direction is formed near the center in the left-right direction on the first region 951 of the lower member 95.

Next, the right member 96 will be described. The right member 96 includes a first region 961, a second region 962, and a third region 963 that are arranged side by side rightward from the right periphery of central portion 78, and are foldably connected to each other. The lengths in the up-down direction of the first region 961 and the second region 962 are the same as that of the central region 78, but the third region 963 is longer therethan and extends downward with respect to the second region 962. Also, a through hole 964 is formed into a rectangular shape from the left end of the second region 962 to near the left-right center of the third region 963. On the other hand, the left member 99 is located on the other side of the central portion 78 and has a shape that is symmetrical to the right member 96 on the left side, and therefore detailed description thereof is omitted.

Figure 15:
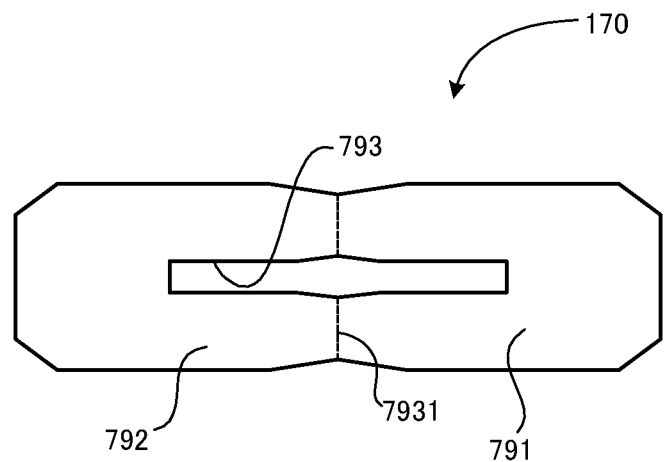
FIG. 15 is a development view of a stopper portion.
Figure 16:
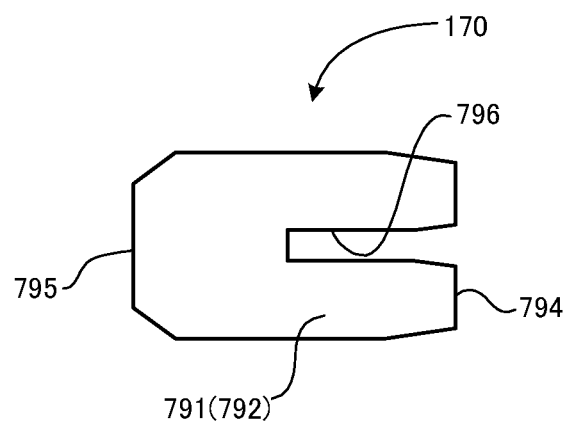
FIG. 16 is a plan view of the stopper portion, obtained by folding the development view shown in FIG. 15.

Next, the stopper portion 170 will be described with reference to FIG. 15. FIG. 15 is a development view of the stopper portion. It should be noted that the stopper portion 170 is also formed integrally using one sheet of cardboard. As shown in FIG. 15, the stopper portion 170 includes a rectangular pair of stopper pieces 791 and 792 that are arranged side by side in the left-right direction in FIG. 15 and are foldably connected. Also, an elongated through hole 793 that extends in the direction in which both stopper pieces 791 and 792 are arranged side by side is formed in the center of the two stopper pieces 791 and 792. The through hole 793 extends so as to intersect the folding line 7931 and extends to near the centers of the stopper pieces 791 and 792. Also, when the stopper pieces 791 and 792 are folded so as to overlap using the folding lines, the stopper portion 170 shown in FIG. 16 is formed. This stopper portion 170 is a plate-shaped member formed into a rectangular shape, and a cutout 796 that extends to near the center is formed at one end portion 794 (hereinafter referred to as "first end portion") of the stopper portion 170 due to the above-described through hole 793. Also, the end portion on the side opposite to the first end portion 794 will be referred to as "second end portion 795".

Figure 17:
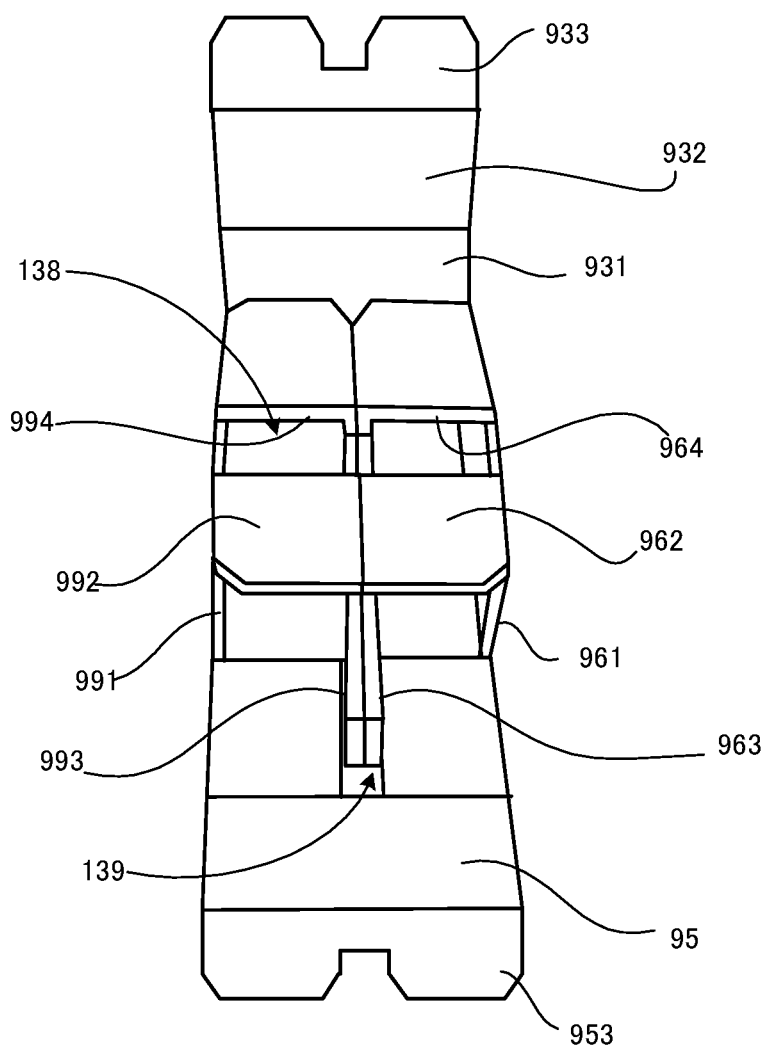
FIG. 17 is a perspective view for illustrating assembly of the movable member.

Next, assembly of the movable member 130 will be described with reference to FIGS. 17 to 20. FIGS. 17 to 20 are perspective views for illustrating assembly of the movable member. First, as shown in FIG. 17, the movable member main body 160 is assembled. First, the right member 96 is folded. That is, the boundary lines connecting the central region 78, the first region 961, the second region 962, and the third region 963 are folded. Accordingly, the first region 961 constitutes a right side surface of the movable member main body 160 and the second region 962 constitutes the right half of the front portion side of the movable member main body 160. The third region 963 extends in parallel to the first region 961 and is disposed near the left-right center of the central region 78. Similarly, the left member 99 is folded. Accordingly, the first region 991 of the left member 99 constitutes the left side surface of the movable member main body 160 and the second region 992 constitutes the left half of the front surface side of the movable member main body 160. Also, as shown in FIG. 17, the third regions 963 and 993 of the right member 96 and the left member 99 are overlaid on each other and are constituted so as to extend in the up-down direction. At this time, in the two third regions 963 and 993, the portion protruding downward with respect to the central portion 78 constitutes a protrusion 139 of the movable member main body 160. Also, the through holes 964 and 994 formed in the right member 96 and the left member 99 constitute a second through hole 138 in the front surface of the movable member main body 160.

Figure 18:
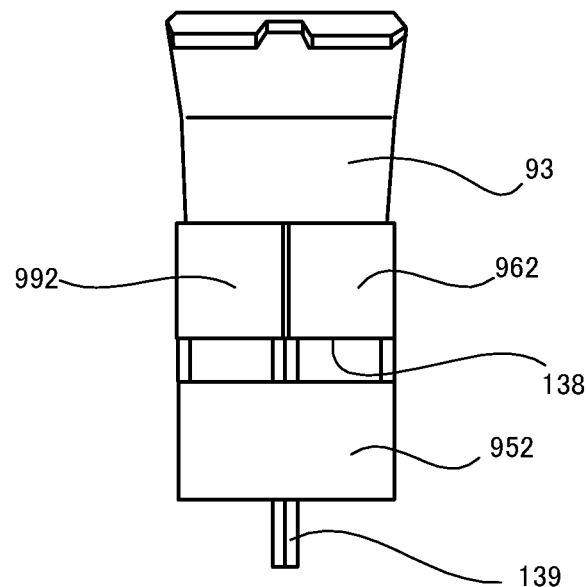
FIG. 18 is a perspective view for illustrating assembly of the movable member.

Next, as shown in FIG. 18, the lower member 95 is folded. That is, the boundary lines connecting the central portion 78, the first region 951, the second region 952, and the third region 953 are folded. Accordingly, the first region 951 constitutes a lower surface of the movable member main body 160. At this time, the above-described protrusion 139 is inserted into the slit 955 formed in the first region 951, and the protrusion 139 is constituted so as to protrude from the first region 951. Also, the second region 952 is overlaid on the lower halves of the second regions 962 and 992 of the right member 96 and the left member 99 and constitutes the lower portion of the front surface of the movable member main body 160. Also, as shown in FIG. 18, the third region 953 is inserted into the above-described second insertion hole 138. At this time, the third regions 963 and 993 of the overlaid right member 96 and left member 99 are fit into the cutout 954 of the third region 953. Due to this, the third region 953 is inserted into the second insertion hole 138 without interfering with the third regions 963 and 993 of the right member 96 and the left member 99.

Figure 19:
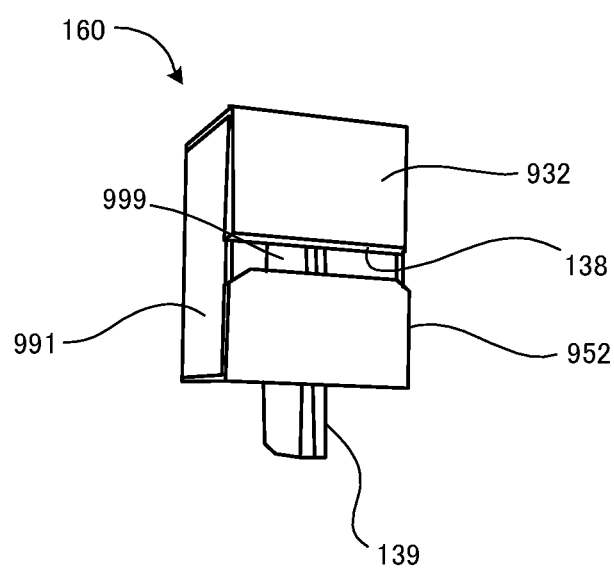
FIG. 19 is a perspective view for illustrating assembly of the movable member.

Similarly, as shown in FIG. 19, the upper member 93 is folded. Accordingly, the first region 931 of the upper member 93 constitutes the upper surface of the movable member main body 160 and the second region 932 is overlaid on the upper halves of the second regions 962 and 992 of the right member 96 and the left member 99 and constitutes the upper portion of the front surface of the movable member main body 160. Also, the third region 933 is inserted into the second insertion hole 138.

In this manner, as shown in FIG. 19, the movable member main body 160 is formed into a cuboid shape, the second insertion hole 138 is formed on the front surface, and the first insertion hole 781 of the central portion 78 is located on the rear surface. Also, the first insertion hole 781 and the second insertion hole 138 form openings and a through hole extending in the front-rear direction is formed in the movable member main body 160. Also, the third regions 963 and 993 of the above-described right member 96 and left member 99 are arranged inside of the through hole so as to intersect in the up-down direction. Hereinafter, this will be referred to as "intersecting plate 999". Furthermore, a plate-shaped protrusion 139 protrudes from the lower surface of the movable member main body 160. The protrusion 139 constitutes an example of the second region of the movable member of the present invention.

Figure 20:
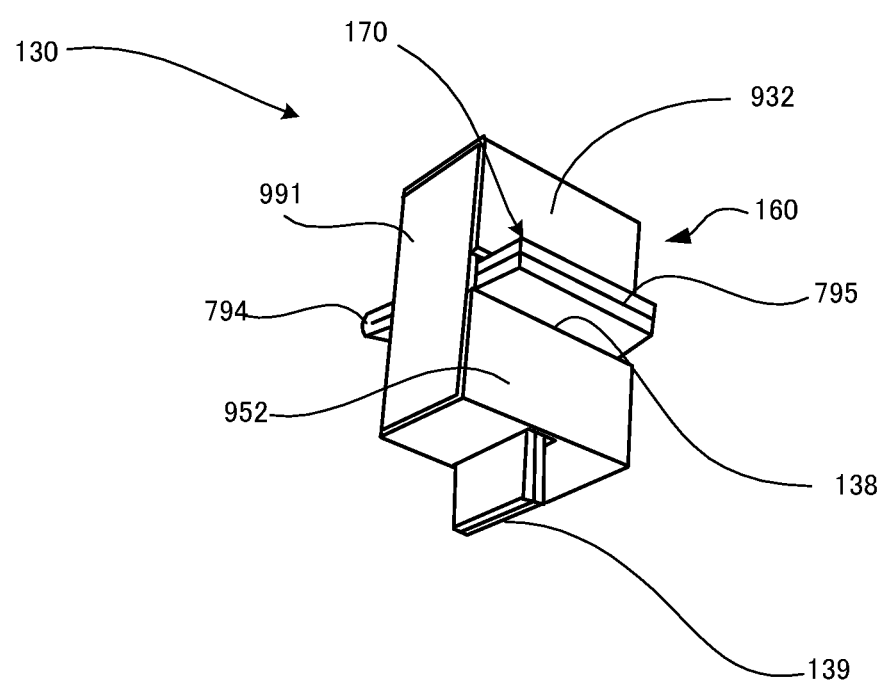
FIG. 20 is a perspective view for illustrating assembly of the movable member.

The folded stopper portion 170 shown in FIG. 16 is attached to the movable member main body 160 formed in this manner. First, the first end portion 794 on the side of the stopper portion 170 on which the cutout 796 is formed is inserted through the second insertion hole 138 of the movable member main body 160. Then, the stopper portion 170 is pressed so as to penetrate through the movable member main body 160 and the first end portion 794 is caused to protrude from the first insertion hole 781. At this time, the cutout 796 of the stopper portion 170 is fit onto the intersection plate 999 inside of the through hole. Accordingly, the stopper portion 170 is positioned in the front-rear direction. In this manner, as shown in FIG. 20, the first end portion 794 and the second end portion 795 of the stopper portion 170 protrude from the front surface and the rear surface, respectively, of the movable member main body 160. The movable member 130 is completed through the foregoing steps.

2-2-3. Cover Member

Next, the cover member 120 will be described with reference to FIG. 21. The cover member 120 is a member that is attached to the upper end portion of the case main body portion 110 and forms the above-described protruding portion 45. Also, the cover member 120 functions also as a holding member of the present invention in order to fulfill a role of holding the movable member 130 in the case main body portion 110.

Figure 21:
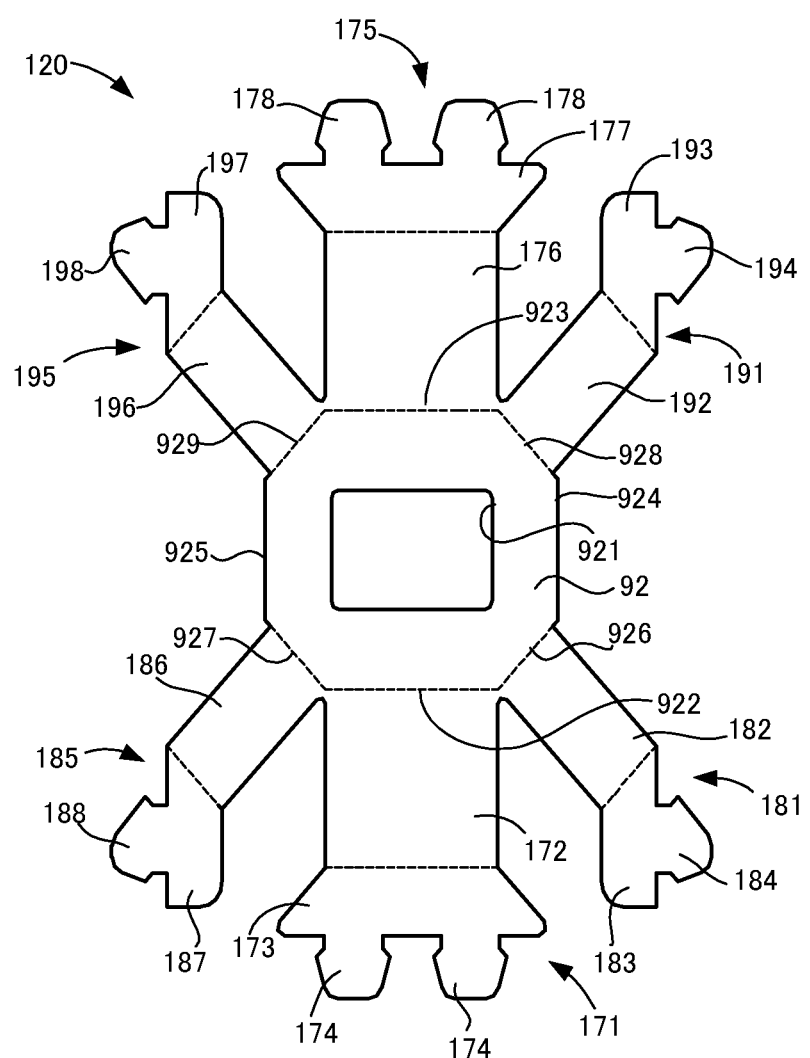
FIG. 21 is a development view of a cover member.

Specifically, as shown in FIG. 21, the cover member 120 includes an octagonal top plate portion 92 that constitutes the upper surface of the case 100. The 8 sides of the top plate portion 92 are constituted as follows. First, the top plate portion 92 has first and second long sides 922 and 923 that face the front surface 71 side and the rear surface 72 side of the case main body portion 110 and extend in the left-right direction. The first long side 922 and the second long side 923 extend in parallel to each other so as to oppose each other. Also, the top plate portion 92 has third and fourth long sides 924 and 925 that face the right side surface 73 side and the left side surface 74 side of the case main body portion 110 and extend in the front-rear direction. The third long side 924 and the fourth long side 925 extend in parallel to each other so as to oppose each other and are arranged so as to intersect the first long side 922 and the second long side 923.

Also, four short sides 926, 927, 928, and 929 that extend obliquely are formed between the four adjacent long sides 922 to 925. Here, for the sake of convenience in the description, the short side on the right side of the first long side 922 will be referred to as "first short side 926", the short side on the left side of the first long side 922 will be referred to as "second short side 927", the short side on the right side of the second long side 923 will be referred to as "third short side 928", and the short side on the left side of the second long side 923 will be referred to as "fourth short side 929".

Also, a rectangular through hole 921 is formed in the center of the top plate portion 92, and as will be described later, the movable member 130 protrudes from the through hole 921.

Also, a first protruding main body portion 171 is foldably connected to the first long side 922 of the top plate portion 92. The first protruding main body portion 171 constitutes part of the above-described protruding portion 45 and includes a protruding surface 172 that is foldably connected to the first long side 922, a trapezoidal lower surface portion 173 that is foldably connected to the leading end edge of the protruding surface 172, and a pair of engaging pieces 174 that protrude from the leading edge of the lower surface portion 173. As described above, the protruding surface 172 is a region that constitutes the front surface of the protruding portion 45, and the lower surface portion 173 is a region that constitutes the lower surface of the protruding portion 45. Also, the pair of engaging pieces 174 are inserted into the attachment hole 710 formed in the front surface 71 of the above-described case main body portion 110.

Also, a first protruding right surface portion 181 is foldably connected to the first short side 926 of the top plate portion 92. The first protruding right surface portion 181 includes a rectangular protruding side surface 182 that is foldably connected to the first short side 926, a trapezoidal lower surface portion 183 that is foldably connected to the leading end portion of the protruding side surface 182, and an engaging piece 184 that protrudes from the lower surface portion 183. As described above, the protruding side surface 182 is a region constituting the side surface on the right side of the protruding portion 45 on the front surface side, and as will be described later, the protruding side surface 182 is assembled so as to extend obliquely from the protruding surface 172 of the protruding portion 45 to the second right side surface portion 732 of the lid portion 150. Also, the lower surface portion 183 is a region that is overlaid on the lower surface portion 173 of the first protruding main body portion 171 and is formed to a size corresponding to the right half of the lower surface portion 183. The engaging piece 184 is overlaid on the engaging piece 174 of the first protruding main body portion 171 and is inserted into the attachment hole 710.

Also, a first protruding left surface portion 185 connected to the second short side 927 has a shape that is left-right symmetrical to that of the first protruding right surface portion 181, and therefore description thereof is omitted. Similarly, a second protruding main body portion 175, a second protruding right surface portion 191, and a second protruding left surface portion 195, which are foldably connected to the second long side 923, the third short side 928, and the fourth short side 929, are symmetrical about the top plate portion 92 with the first protruding main body portion 171, the first protruding right surface portion 181, and the first protruding left surface portion 185, and therefore description thereof is omitted.

2-2-4. Assembly of Case

Figure 22:
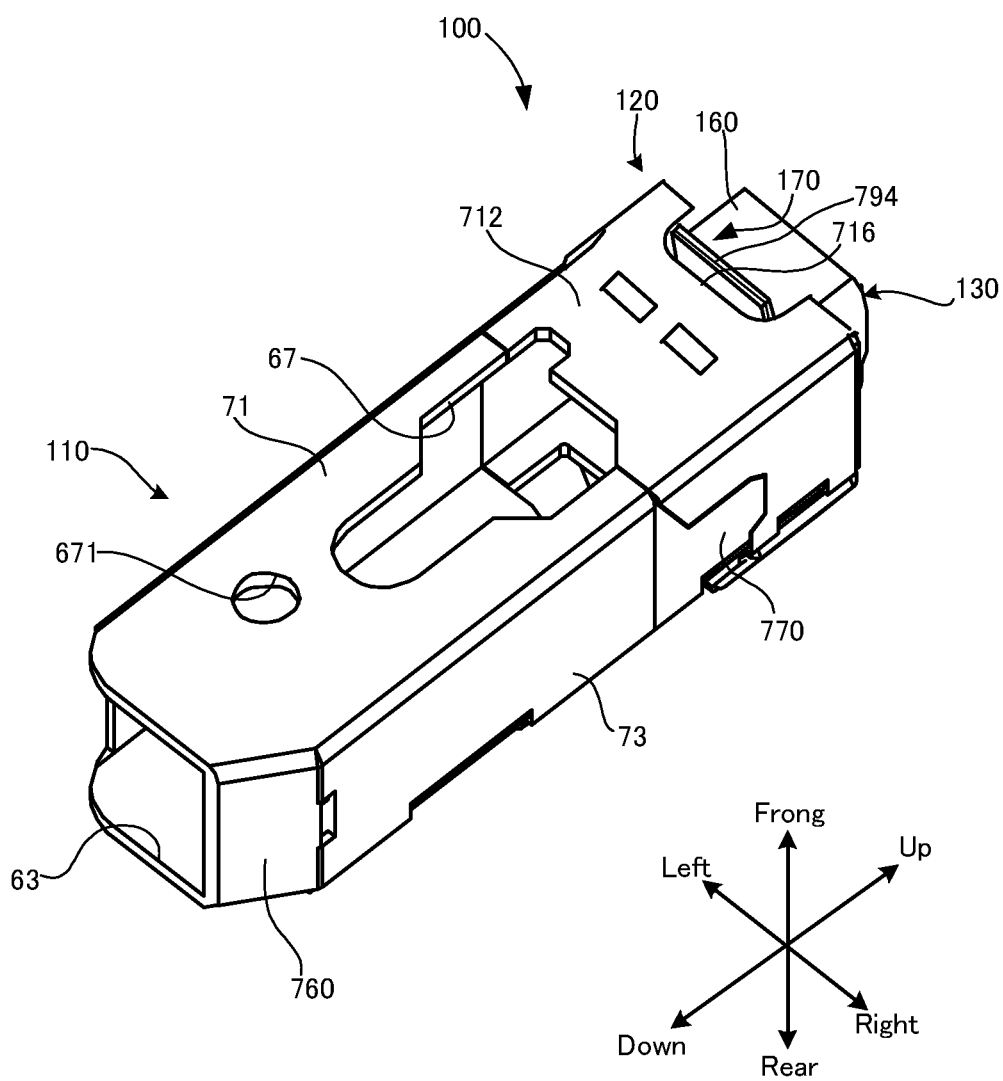
FIG. 22 is a perspective view for illustrating assembly of the case.
Figure 23:
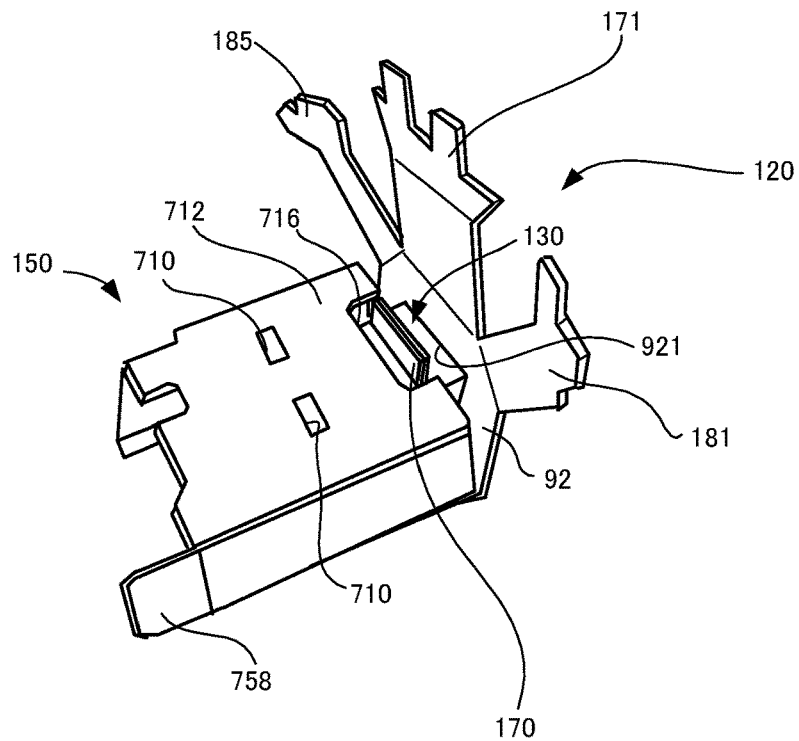
FIG. 23 is a perspective view for illustrating assembly of the case.
Figure 24:
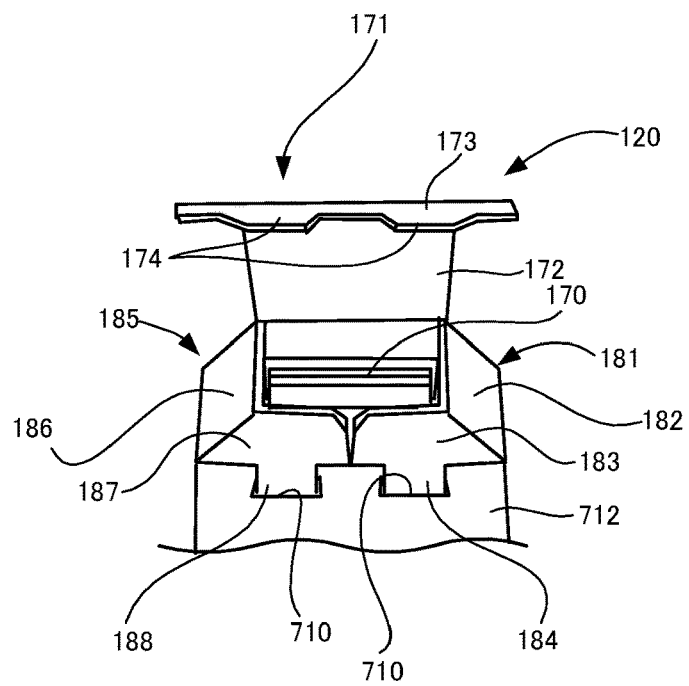
FIG. 24 is a perspective view for illustrating assembly of the case.

Next, attachment of the cover member 120 and the movable member 130 to the case main body portion 110 using the case main body portion 110 and the movable member 130, which were assembled as described above, that is, assembly of the case 100, will be described with reference to FIGS. 22 to 24 as well. FIGS. 22 to 24 are perspective views for illustrating assembly of the case. Note that in FIG. 23, only the lid portion 150 of the case main body portion 110 is shown, and the accommodating portion 140 is not shown. First, as shown in FIG. 22, the movable member 130 is attached to the opening on the upper end of the case main body portion 110. At this time, the protrusion 139 is disposed so as to face downward, and both end portions 794 and 795 of the stopper portion 170 are arranged so as to fit into the second cutout 716 of the second front surface portion 712 and the fourth cutout 725 of the second rear surface portion 722. Accordingly, the stopper portion 170 bridges between the second cutout 716 and the fourth cutout 725 and downward movement of the movable member 130 is restricted. The stopper portion 170 slightly protrudes from the second front surface portion 712 and the second rear surface portion 722. Also, the upper portion of the movable member 130 protrudes upward from the upper opening of the case main body portion 110.

Next, the cover member 120 is attached. First, as shown in FIG. 23, the top plate portion 92 of the cover member 120 is disposed so as to cover the upper end opening of the case main body portion 110. At this time, the upper portion of the movable member 130 is caused to protrude from the through hole 921 of the top plate portion 92. The portion that protrudes in this manner from the through hole 921 constitutes an example of the first region of the movable member of the present invention. Also, since the top plate portion 92 is arranged so as to come into contact with the upper edge of the case main body portion 110, the upper portions of the second cutout 716 of the second front surface portion 712 and the fourth cutout 725 of the second rear surface portion 722 are closed. Accordingly, upward movement of the stopper portion 170 is restricted.

Next, as shown in FIG. 24, the first protruding left surface portion 185 connected to the first short side 926 of the top plate portion 92 is folded. That is, the boundary between the first short side 926 and protruding side surface 182 and the lower surface portion 183 is folded at a right angle, and the engaging piece 184 is engaged with the attachment hole 710. Accordingly, the protruding side surface 182 extends in the up-down direction below the top plate portion 92 and constitutes an oblique surface that extends obliquely from the front surface 71 to the right side surface 73. The oblique surface constitutes the right side surface of the protruding portion 45 of the front surface. On the other hand, the lower surface portion 183 constitutes a surface facing downward on the inner side with respect to the protruding side surface 182. Similarly, the first protruding left surface portion 185 is also folded, the oblique surface that extends obliquely from the front surface 71 to the left side surface 74 is formed by the protruding side surface 186, and the surface facing downward is formed by the lower surface portion 187. Thus, as shown in FIG. 24, the two protruding side surfaces 182 and 186 of the protruding portion 45 are formed.

Thereafter, the first protruding main body portion 171 is folded. That is, the boundary between the first long side 922 and protruding surface 172 and the lower surface portion 173 is folded at a right angle, and the engaging piece 174 is engaged with the attachment hole 710. At this time, the lower surface portion 173 is overlaid from the lower side on the lower surface portions 183 and 187 of the first protruding right surface portion 181 and the first protruding left surface portion 185. Also, the engaging piece 174 is overlaid on the engaging pieces 184 and 188 of the first protruding right surface portion 181 and the first protruding left surface portion 185 and is engaged with the attachment hole 710. In this manner, as shown in FIG. 8, the protruding surface 172 extends in the up-down direction below the top plate portion 92 and constitutes the front surface of the protruding portion 45. On the other hand, the lower surface portion 173 constitutes the lower surface of the protruding portion 45. Thus, the lower surface (contact surface) of the protruding portion 45 is strong because it is formed in two layers due to the lower surface portion 173 of the first protruding main body portion 171 and the lower surface portions 183 and 187 of the first protruding right surface portion 181 and the first protruding left surface portion 185 being overlaid. Note that "region constituting a contact surface" in the present invention refers to a region constituted by the three lower surface portions 173, 183, and 187.

Similarly to the description above, the second protruding main body portion 175, the second protruding right surface portion 191, and the second protruding left surface portion 195 are also folded to form the protruding portion 45 of the rear portion. The protruding portion 45 formed in this manner is disposed so as to cover the stopper portion 170 of the movable member 130 on the upper portion of the case main body portion 110. Accordingly, the cover member 120 also fulfills a role of holding the movable member 130 in the case main body portion 110. The cover shown in FIGS. 8 and 9 is completed through the above-described steps.

3. Method for Accommodating Right Controller in Case

Figure 25:
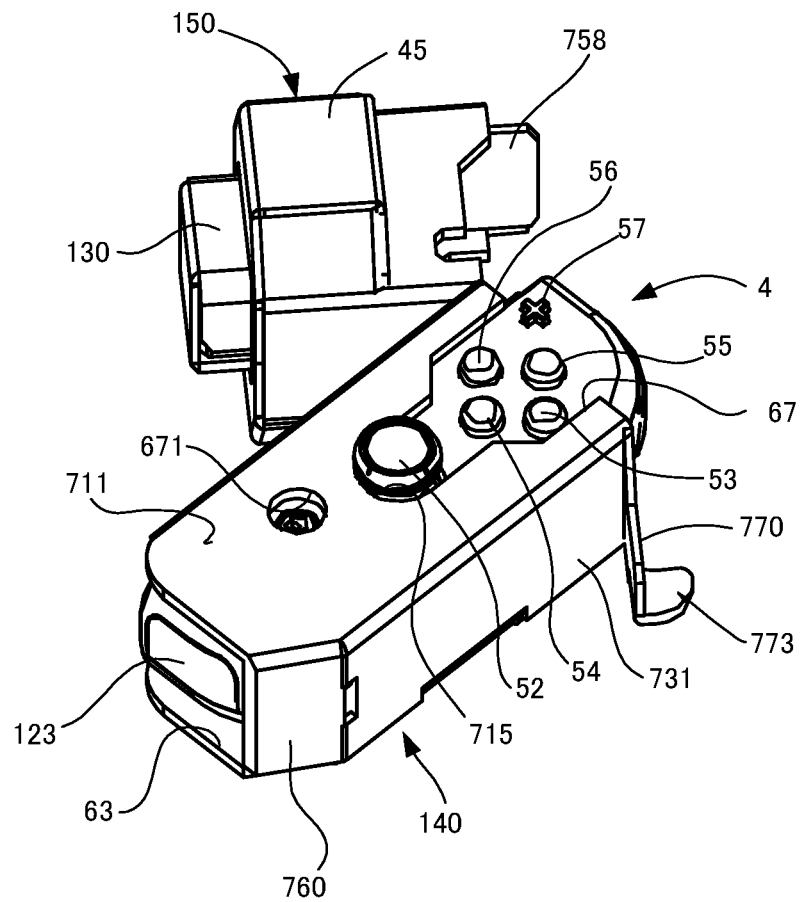
FIG. 25 is a perspective view for illustrating a method for using the case.

Next, a method for using the case assembled as described above will be described. First, starting from the state shown in FIG. 8, a finger is hooked into the finger insertion hole 774 in the right side surface 73 of the case 100 and the fixing piece 770 is swung. That is, the fixing piece 770 is pulled so as to separate from the right side surface 73. Accordingly, the protrusion 773 provided on the fixing piece 770 is separated from the third insertion hole 755 and the locked state of the lid portion 150 and the accommodating portion 140 is canceled (unlocked position). Next, as shown in FIG. 10, the lid portion 150 is swung by the hinge 169 on the left side surface 74 and the insertion port 250 of the accommodating portion 140 is opened. Next, the right controller 4 is inserted into the insertion port 250. At this time, the lower end surface of the right controller 4, that is, the infrared image capturing section 123 is oriented to the lower end portion side of the case 100, that is, the first opening portion 63, and after the orientation of the right controller 4 is determined such that the first main surface faces the front surface of the case 100, the right controller 4 is inserted into the insertion port 250. Then, the right controller 4 comes into contact with the restricting plate 760 inside of the case 100 and is positioned in the up-down direction such that it does not move any further toward the lower end portion. Thus, as shown in FIG. 25, the infrared image capturing section 123 of the right controller 4 and the infrared light-emitting section 124 are exposed from the first opening portion 63 in a state of being located slightly inward from the edge portion of the first opening portion 63.

At this time, the buttons 52 to 58 and the like on the first main surface of the right controller 4 are exposed from the second large opening portion 67 and the second small opening portion 671. Also, the analog stick 52 is exposed from near the lower end of the second region 715 of the second large opening portion 67, but as described above, the up-down position of the right controller 4 is positioned, and therefore the analog stick 52 is prevented from coming into contact with the inner circumferential edge of the second region 715. Accordingly, operation of the analog stick 52 is not hindered.

Figure 26:
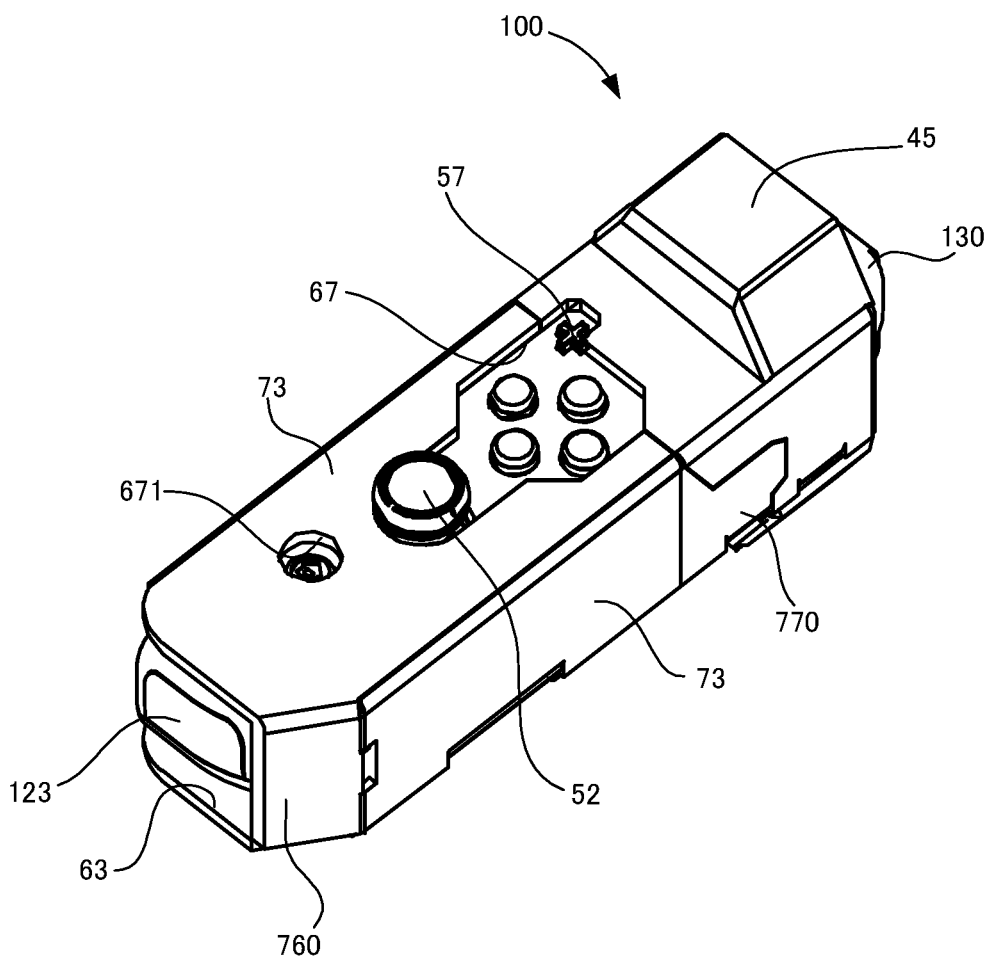
FIG. 26 is a perspective view for illustrating a method for using the case.

Next, the lid portion 150 is swung to the closed state to cover the upper end portion of the right controller 4 protruding from the accommodating portion 140. At this time, the protruding piece 758 protruding downward from the lid portion 150 is inserted inside of the first right side surface portion 731 of the accommodating portion 140. Next, the fixing piece 770 is swung to come into contact with the right side surface 73. At this time, the protrusion 773 is inserted into the third insertion hole 755, and therefore the fixing piece 770 is fixed in a state of being in contact with the right side surface 73 (locked position). That is, the closed state of the lid portion 150 is held, and as shown in FIG. 26, the accommodation of the right controller 4 is completed.

Figure 27:
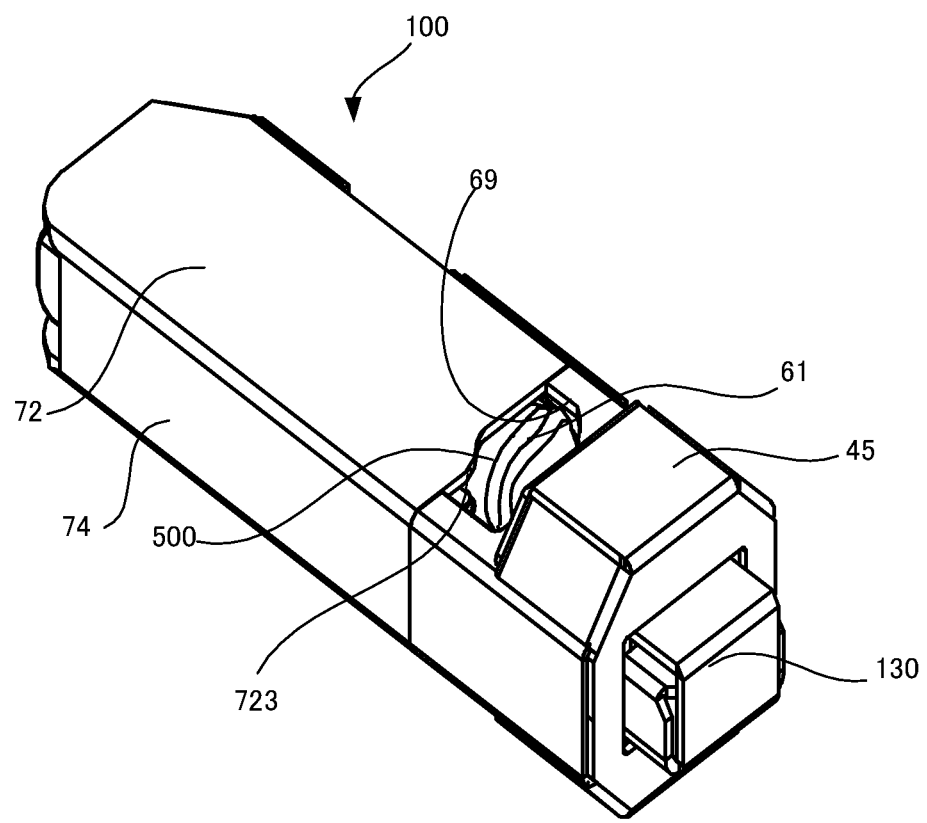
FIG. 27 is a perspective view for illustrating a method for using the case.

At this time, as shown in FIG. 27, the ZR button 61 and the bulging portion 500 on the second main surface of the right controller 4 are exposed from the third opening portion 69 provided in the lid portion 150. In particular, the inclined surface on the lower portion of the bulging portion 500 comes into contact with the upper edge 723 of the first rear surface portion 721, and thereby the right controller 4 can be restricted from moving toward the lower end portion of the case 100.

Also, in the state in which the lid portion 150 is closed, the first R button 60 of the right controller 4 is slightly pushed up by the movable member 130. That is, while the protrusion 139 and the first R button 60 are in contact, the movable member 130 is pushed up toward the upper end of the case 100 within a range in which the stopper portion 170 can be moved up and down. Accordingly, the first R button 60 can be pressed by pressing the movable member 130.

4. Method for Using Case

As shown in FIGS. 26 and 27, even when the right controller 4 is accommodated in the case 100, the various buttons 53 to 58, and the analog stick 52 on the first main surface, the ZR button 61 on the second main surface, and the infrared image capturing section 123 on the lower end surface are exposed to the outside, and therefore operations can be performed similarly to when the right controller 4 is not accommodated in the case 100.

Figure 28:
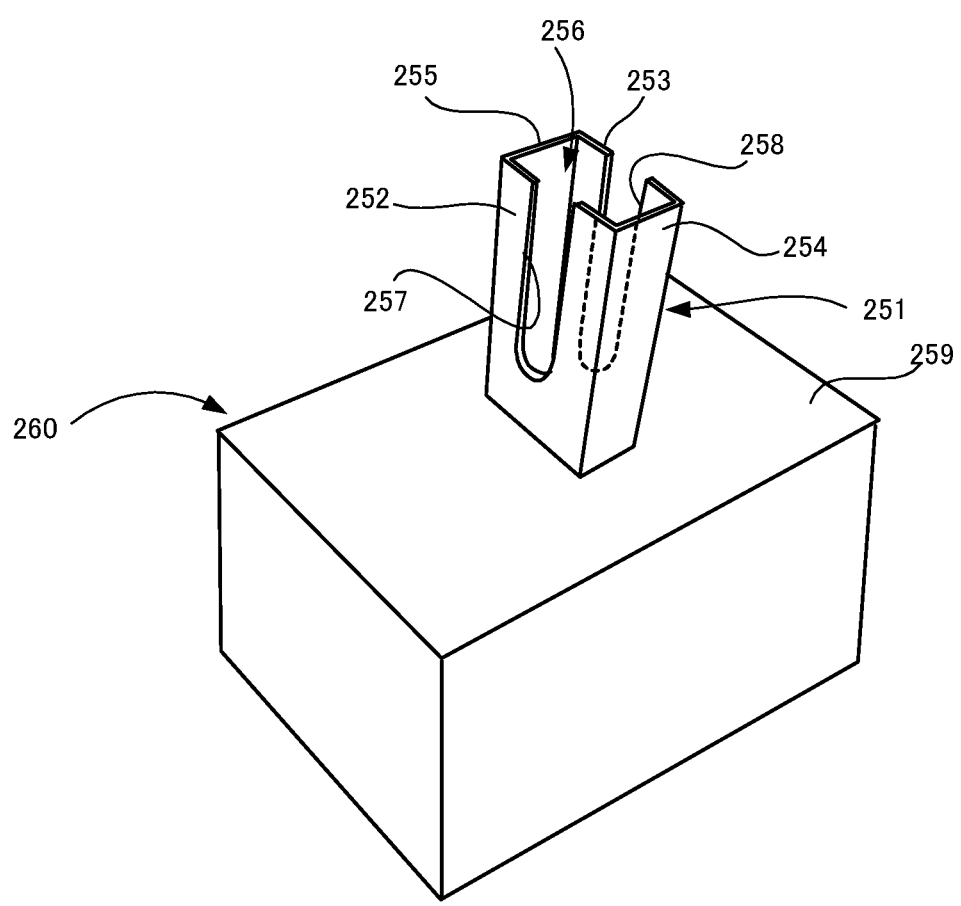
FIG. 28 is a perspective view for illustrating a method for using the case.

Also, the case 100 accommodating the right controller 4 can be attached to an additional device 260 for games, as shown in FIG. 28, for example. In the following description, the case 100 in which the right controller 4 is accommodated will also be referred to simply as "case 100".

As shown in FIG. 28, the additional device 260 includes a cuboid base platform 259, and a holding portion 251 that is arranged on the base platform shape and holds the case 100. The holding portion 251 is formed into a rectangular tube shape having a front surface plate 252, a rear surface plate 253, a right side surface plate 254, and a left side surface plate 255, and an opening portion 256 into which the case 100 is to be inserted is formed at the upper portion of the holding portion 251. The front surface plate 252, the rear surface plate 253, the right side surface plate 254, and the left side surface plate 255 correspond to the front surface 71, the rear surface 72, the right side surface 73, and the left side surface 74 of the case 100, and a cross-section of the internal space surrounded thereby approximately matches the outer shape of the case main body portion 110. Accordingly, when the case 100 is accommodated in the holding portion 251, the case main body portion 110 is held so as to be in close contact with the inner wall surface of the holding portion 251.

Also, slits 257 and 258 that extend in the up-down direction are formed on the front surface plate 252 and the rear surface plate 253 of the holding portion 251. The slits 257 and 258 are open upward at the upper edges of the front surface plate 252 and the rear surface plate 253 and extend downward. The widths in the left-right direction of the slits 257 and 258 are almost the same as the width of the second large opening portion 67 in the front surface 71 of the case 100. Accordingly, when the case 100 is accommodated in the holding portion 251, protruding items such as the analog stick 52 and the ZR button 61 that protrude from the case 100 pass through the slits 257 and 258 and therefore do not interfere with the front surface 71 or the rear surface 72 of the holding portion 251.

Figure 29:
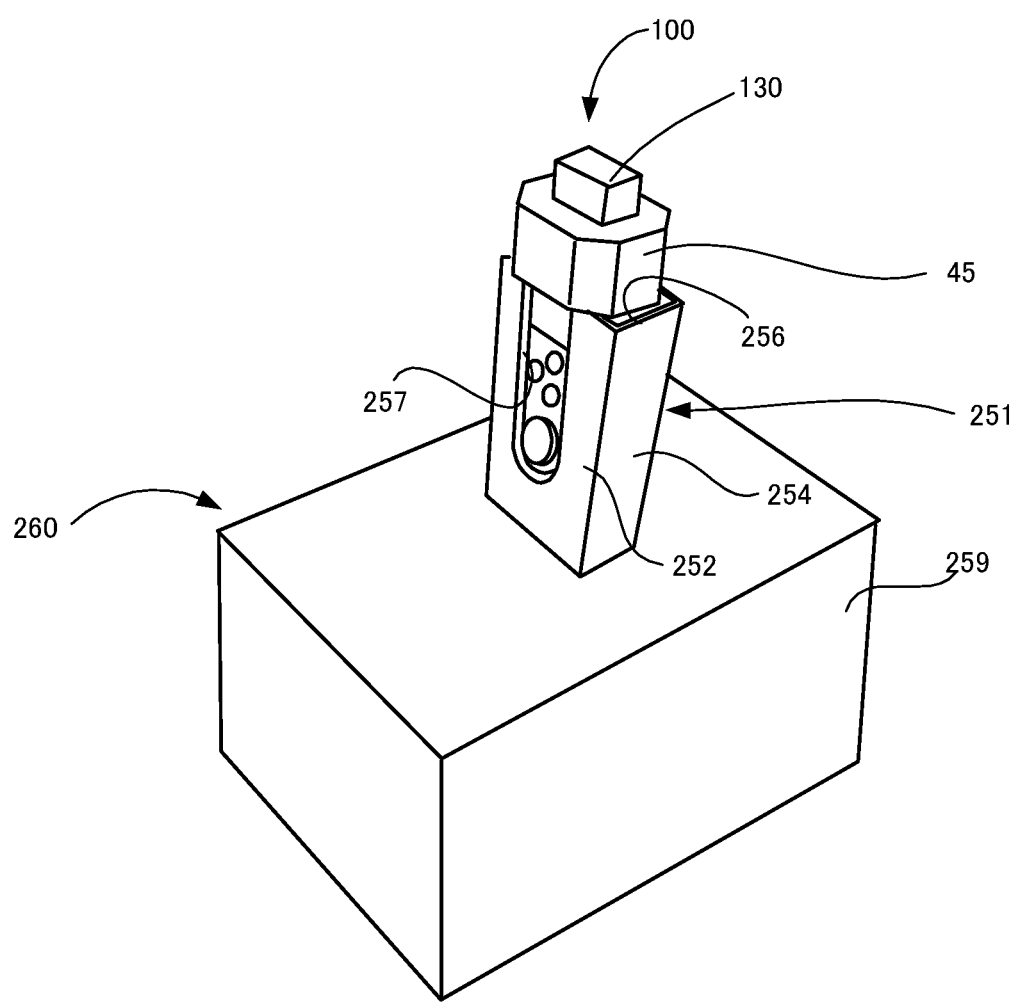
FIG. 29 is a perspective view for illustrating a method for using the case.

Then, as shown in FIG. 29, when the case 100 is accommodated in the holding portion 251, the protruding portion 45 of the case 100 is engaged with the opening portion 256 of the holding portion 251. Accordingly, the case 100 is held without falling inside of the holding portion 251, and the position in the up-down direction with respect to the additional device 260 is fixed. In this state, the infrared image capturing section 123 of the right controller 4 exposed from the case 100 can capture an image of the interior of the additional device 260, and the main body apparatus 2 of the game system can be operated wirelessly from the right controller 4. Also, even if the case 100 is held, the movable member 130 is exposed to the outside from below the holding portion 251, and therefore the right controller 4 can be operated by pressing the movable member 130. In addition, most of the operation buttons (e.g., 53 to 58) of the right controller 4 are exposed to the outside of the holding portion 251 via the slits 257 and 258, and therefore the operation buttons 53 to 58 can also be operated.

5. Characteristics

With the case according to the present embodiment, the following effects can be obtained.

(1) Since the protruding portions 45 that protrude from the outer surface of the case main body portion 110 are provided, the case 100 can be held by hooking onto another member using the protruding portions 45. Accordingly, for example, upon being inserted into the holding portion 251 of the above-described additional device 260, the protruding portions 45 are hung on the upper edge of the holding portion 251, and therefore the case 100 can be held in the holding portion 251. For this reason, if an image of the interior of the additional device 260 is to be captured using the infrared image capturing section 123, the distance to the object is fixed, and therefore accurate image capture can be performed.

(2) Since the heights of the protruding portions 45 protruding from the front surface 71 and the rear surface 72 of the case main body portion 110 are the same, when inserted into the holding portion 251, the case 100 can be inserted into the holding portion 251 without making a distinction between the orientations of the front surface 71 and the rear surface 72. That is, in the above description, the case was inserted such that the front surface 71 and the rear surface 72 of the case 100 correspond to the front surface plate 252 and the rear surface plate 253 of the holding portion 251, but they can also be inserted in the opposite orientation.

(3) The protruding heights H of the protruding portions 45 are higher than those of the operation buttons 53 to 58 and the analog stick 52 exposed from the case main body portion 110, and therefore the operation buttons and the like can be protected from collision with another member from above.

(4) The protruding portions 45 are formed into shapes with trapezoidal cross sections and have inclined surfaces. Also, the upper end portion of the case is formed into an octagonal column shape overall by the two protruding portions 45, the right side surface 73, and the left side surface 74, and therefore the upper end portion has a good appearance. In particular, the protruding portions 45 are trapezoidal in a view from below, and the protruding surface 172 on the front surface 71 side and the pair of protruding side surfaces 182 and 186 are constituted by separate members, and therefore the overall shape is prevented from deteriorating even if one of the parts is pressed. Also, when the protruding surface 172 is pressed, the press is received by the pair of protruding side surfaces 182 and 186, which are inclined surfaces, and therefore the strength can be increased. The same applies to the protruding portion 45 on the rear surface 72 side as well.

(5) The case 100 is made of cardboard and can be assembled by folding, and therefore manufacture is easy and cost is low. Also, machining such as cutting is easy.

(6) The case 100 is constituted by the accommodating portion 140 and the lid portion 150, which are arranged side by side in the longer direction, and the lid portion 150 is constituted so as to be able to open and close using the hinge 169. Accordingly, the accommodation of the right controller 4 extending in the longer direction is easy.

(7) A fixing piece 770 fixed to the lid portion 150 is provided so as to be able swing on the accommodating portion 140. Accordingly, by fixing the fixing piece 770 to the lid portion 150, the closed state of the lid portion 150 is held, and the lid portion 150 can be prevented from opening unexpectedly.

(8) The protrusion 139 of the movable member 130 is formed into a sheet shape and comes into linear contact with the first R button 60. That is, since the contact area is small, force can be reliably transmitted when the movable member 130 is pressed. Also, the protrusion 139 is made of a plate material, and the surface direction of the plate material and the direction of pressing the first R button 60 are parallel. That is, the protrusion 139 can orthogonally come into contact with the first R button 60, and therefore when the first R button 60 is pressed, the protrusion 139 can be prevented from warping. Accordingly, when the movable member 130 is pressed, the force can be transmitted more reliably to the first R button 60. Accordingly, even if the movable member 130 is made of cardboard, the first R button 60 can be pressed reliably.

(9) The lid portion 150 is provided with the protruding piece 758 that protrudes downward from the lower opening. For this reason, when the lid portion enters the closed state, the lid portion 150 can easily be positioned so as to cover the insertion port 250 of the accommodating portion 140 by inserting the protruding piece 758 inside of the first right side surface portion 731 of the accommodating portion 140.

6. Variations

Although embodiments of the present invention have been described above, the present invention is not limited to the above-described embodiments, and various modifications are possible without departing from the gist of the invention. For example, the following variations are possible. Also, the following variations can be combined as appropriate.

(1) In the above-described embodiment, the case main body portion 110 is formed into a cuboid shape, but it may also have another shape. For example, a circular column shape, a polygonal column shape, and the like are possible, and there is no particular limitation as long as the right controller 4 can be accommodated. Also, the shape and position of the opening portion are also not particularly limited, and it is sufficient that at least some of the operation buttons and the like are exposed.

(2) In the above-described embodiment, the case 100 is formed by the case main body portion 110, the movable member 130, and the cover member 120, but there is no limitation to this, and all of the parts can also be formed integrally, or they can be formed by four or more parts. That is, as long as the portion accommodating the right controller 4, the portion forming the protruding portion 45, and the portion pressing the first R button 60 are present, there is no particular limitation on the number and the shape of the parts forming these portions.

(3) In the above-described embodiment, the protruding portions 45 are provided on the upper end portion of the case main body portion 110, but the configuration of the protruding portions 45 is also not particularly limited. That is, the protruding portions 45 need only be provided on the upper end side with respect to the third opening portion 69 in the case main body portion 110, and the shape, position, and number thereof can be determined as appropriate. Accordingly, other than providing one protruding portion on each of the above-described front surface 71 and the rear surface 72, it is also possible to provide only one protruding portion on one of the surfaces, to provide the protruding portions on the side surfaces 73 and 74 of the case main body portion 110, and to provide multiple protruding portions on each of the surfaces. Also, a protruding portion that spans across multiple surfaces can also be formed. Regarding the shape as well, for example, the protruding portions may include curved surfaces, and multiple rod-shaped protruding portions can also be provided. Furthermore, the protruding portions 45 can also be made of a material different from that of the case main body portion 110.

Also, if multiple protruding portions 45 are provided, their heights do not necessarily need to be the same. That is, in the above-described embodiment, the protruding heights of the protruding portions 45 of the front surface 71 and the rear surface 72 are made the same, but they may be different.

In the protruding portions 45, in order to engage with another member, it is preferable to provide a surface 173 that faces the second end portion side, but this is also not essential. Also, in the above-described embodiments, the surface 173 is made of a multi-layered plate material, but it can also be made of a single plate material.

In the above-described embodiment, the protruding portions 45 are formed by the cover member 120, which is a separate member from the case main body portion 110, but there is no limitation to this. For example, part of the outer surface of the case main body portion 110 can be caused to bulge, and this can be used as the protruding portion. In this case, the case main body portion 110 and the protruding portion 45 are formed integrally, but in terms of the outer shape, the regions that protrude from the outer surface of the case main body portion 110 accommodating the right controller 4 and hook onto the other member or are retained when gripped can all be referred to as the protruding portions of the present invention.

It should be noted that it is also possible to use a case 100 that does not include the protruding portions 45.

(4) In the above-described embodiment, the case 100 is made of cardboard, but even with another material, there is no particular limitation as long as machining such as folding using a person's hands can be performed and the material is made of paperboard such that the shape resulting from machining is maintained to a certain extent. Also, the case can also be formed by combining multiple types of materials. Furthermore, all of the case 100 need not be made of paperboard, and portions that do not require machining such as folding can also be made of a resin material or the like. Alternatively, all of the case 100 can also be made of a resin material or a material such as rubber.

(5) The movable member 130 is not limited to the mode of the above-described embodiment, and it is sufficient that part of it is exposed to the outside such that it can be pressed by a user, and furthermore, that part of it can press the first R button 60 of the right controller 4. Accordingly, the case need not be constituted by the movable member main body 160 and the stopper portion 170, and the shape and size can be modified as appropriate. For example, the movable member can also be constituted by only a plate material. For example, a plate material that covers the first R button 60 exposed from the case main body portion 110 can be provided, and the first R button 60 can also be pressed by pressing the plate material.

In the above-described embodiment, the movable member 130 and the cover member 120 are constituted by separate members, but they can also be formed integrally. For example, the first R button 60 may be pressed when the through hole 921 of the top plate portion 92 of the cover member 120 is closed and the top plate portion 92 is pressed. That is, as long as a configuration is used in which the first R button 60 can be pressed when a pressed operation is performed by the user, the movable member corresponds to the movable member of the present invention. In this case, the protruding portion need not be provided.

Also, in the above-described embodiment, the cover member 120 is used to hold the movable member 130 in the case main body portion 110, but a method other than this may also be used. That is, the cover member 120 fulfills the role of forming the protruding portions 45 and holding the movable member 130, but the movable member 130 can also be attached to the case main body portion 110 so as to be able to press the first R button 60, without providing the protruding portions 45, and mainly using the member for holding the movable member 130.

Note that the movable member 130 is not required, and it is also possible to provide an opening at the upper end portion of the case main body portion 110 and directly press the first R button 60.

(6) In the above-described embodiment, the right controller 4 accommodated in the case main body portion 110 is prevented from moving toward the second end portion by the restricting plate 760 and the upper edge 723 of the third opening portion 69, but the restricting portion, which is a means for restricting movement of the controller toward the second end portion, may have another configuration, and for example, it is sufficient that a member that hooks onto a region of the controller is provided.

(7) The case according to the present invention is a concept also encompassing the cover for the controller and an accommodation device.

(8) In the above-described embodiment, the right controller 4 was given as an example of a controller, but the controller accommodated in the case according to the present invention is not limited to this. For example, the first main surface, the second main surface, the first end surface, the second end surface, the first side end surface, and the second side end surface of the controller may be flat surfaces, curved surfaces, or a combination thereof. The surfaces can also be defined as follows, for example. It is sufficient that at least part of the first end surface and the second end surface is a surface that faces the longer direction of both main surfaces, is somewhat inclined, or a portion may have a curved surface and be connected to another surface. Similarly, at least part of the first side end surface and the second side end surface need only be a surface that faces the shorter direction of the main surfaces, and the first side end surface and the second side end surface may be somewhat inclined and portions thereof may be curved and connected to another surface. Also, although a case is also conceivable in which the boundaries between the surfaces are unclear, this portion can be defined as described above as long as there are at least surfaces that face the longer direction and the shorter direction as described above.

Also, the operation buttons of the operation portions may extend to another surface. For example, the operation button of the first operation portion may be formed so as to extend from the first end surface to the first side end surface. Furthermore, the operation portions encompass not only operation buttons, but also members such as guides provided along the buttons.

The image capturing section is provided on the second end surface of the controller, but the entirety of the image capturing section does not need to be provided on the second end surface. For example, a case is also encompassed in which the constituent components (image sensor and the like) of the image capturing section are arranged inside of the controller and an image of the outside can be captured from the second end surface via a window or protection cover formed on the second end surface.

Also, the controller that is the subject of the present invention is not limited to a dedicated controller for a game device. For example, if a portable information terminal such as a smartphone is used to operate another device in addition to a controller for operating a device other than a game console, this can also be the controller that is the subject of the present invention.

LIST OF REFERENCE NUMERALS

4 Right controller
  45 Protruding portion
  52 Analog stick (first operation portion)
  53 to 58 Operation button (first operation portion)
  60 First R button (second operation portion)
  61 ZR button (third operation portion)
  63 First opening portion
  67 Second large opening portion (second opening portion)
  671 Second small opening portion (second opening portion)
  69 Third opening portion
  71 Front surface (first surface)
  711 First front surface portion (first accommodating surface)
  712 Second front surface portion (first lid surface)
  72 Rear surface (second surface)
  721 First rear surface portion (second accommodating surface)
  722 Second rear surface portion (second lid surface)
  73 Right side surface (first side surface)
  731 First right side surface portion (first accommodating side surface)
  732 Second right side surface portion (first lid side surface)
  74 Left side surface (second side surface)
  741 First left side surface portion (second accommodating side surface)

742 Second left side surface portion (second lid side surface)
100 Case
110 Case main body
120 Cover member (holding member)
123 Infrared image capturing section
130 Movable member
139 Protrusion (second region)
140 Accommodating portion
150 Lid portion
170 Stopper portion
173 Lower surface portion (contact surface)
177 Lower surface portion (contact surface)
500 Bulge portion (third operation portion)
723 Upper edge (second restricting portion)
755 Third insertion hole (recessed portion)
760 Restricting plate (first restricting portion)
758 Protruding piece
770 Fixing piece (lock member)
773 Protrusion
H Protruding height

What is claimed is:

1. A case configured to accommodate a controller, the controller including:
a first main surface; a second main surface provided on a side opposite to the first main surface; a first side surface and a second side surface provided on both ends in a longer direction of the first main surface and the second main surface; and a first side end surface and a second side end surface provided on both ends in a shorter direction of the first main surface and the second main surface, the controller further including: a first operation portion provided on the first main surface; a second operation portion provided on the first end surface; a third operation portion provided on the second main surface; and an image capturing section provided on the second end surface, the case comprising:
a case main body portion having an accommodating space in which the controller can be accommodated;
a movable member disposed at a position opposing an operation button included on the second operation portion when the controller is accommodated in the accommodating space,
the movable member includes:
a first region that can be operated by a user; and
a second region that can press the operation button of the second operation portion in response to the operation on the first region when the controller is accommodated in the accommodating space; and
at least one protruding portion protruding at a first height from a surface of the case main body portion, at least, when the case is assembled,
wherein the case main body portion is formed into a lengthwise shape including:
a first end portion configured to face the first end surface of the controller when the controller is accommodated in the accommodating space; and
a second end portion configured to face the second end surface of the controller when the controller is accommodated in the accommodating space,
the case main body portion is provided with:
a first opening portion that is provided on the second end portion side and is for allowing image capture of the outside of the case main body portion by the image capturing section when the controller is accommodated in the accommodating space;
a second opening portion from which at least part of the first operation portion is exposed when the controller is accommodated in the accommodating space; and
a third opening portion from which at least part of the third operation portion is exposed when the controller is accommodated in the accommodating space,
the protruding portion is disposed on the first end portion side with respect to the third opening portion, and
the case being made of paperboard.

2. The case according to claim 1, wherein
the protruding portion has a contact surface that faces the second end portion side, and
at least part of a region constituting the contact surface in the protruding portion is made of a plurality of layers of paperboard.

3. The case according to claim 1, wherein the case main body portion includes:
a first surface portion configured to face the first main surface;
a second surface portion configured to face the second main surface;
a first side surface portion configured to face the first side end surface; and
a second side surface portion configured to face the second side end surface, and
the protruding portion protrudes from at least one of the first surface portion, the second surface portion, the first side surface portion and the second side surface portion.

4. The case according to claim 3, wherein the protruding portion includes:
a first protruding member that protrudes from the first surface portion; and
a second protruding member that protrudes from the second surface portion.

5. The case according to claim 4, wherein
the first protruding member includes:
a first protruding surface that is substantially parallel to the first surface portion; and
a pair of first inclined surfaces that extend obliquely from both sides of the first protruding surface to the first side surface portion and the second side surface portion, and
the second protruding member includes:
a second protruding surface that is substantially parallel to the second surface portion; and
a pair of second inclined surfaces that extend obliquely from both sides of the second protruding surface to the first side surface portion and the second side surface portion.

6. The case according to claim 4, wherein a protruding height of the first protruding member from the first surface portion and a protruding height of the second protruding member from the second surface portion are approximately the same.

7. The case according to claim 3, wherein
at least part of the first operation portion is configured to protrude to the outside from the first opening portion when the controller is accommodated in the accommodating space,
at least one of the protruding portions is provided on the first surface portion, and
the protruding height of the protruding portion from the first surface portion is greater than the protruding height of the first operation portion protruding from the first surface portion.

8. The case according to claim 3, wherein
at least part of the third operation is configured to protrude to the outside from the third opening portion when the controller is accommodated in the accommodating space,
at least one of the protruding portions is provided on the second surface portion, and
the protruding height of the protruding portion from the second surface portion is greater than the protruding height of the third operation portion protruding from the second surface portion.

9. The case according to claim 1, wherein
the case main body portion includes:
  an accommodating portion that includes an insertion port into which the controller is to be inserted, and is for accommodating the controller in a state in which part of the first end surface side is exposed from the insertion port; and
  a lid portion to be connected to part of the accommodating portion so as to cover part of the first end surface side of the controller exposed from the accommodating portion, and
  the lid portion is configured to be able to enter a closed state in which the insertion port is closed, and an open state in which the insertion port is open and part of the first end surface side of the controller is exposed.

10. The case according to claim 1, wherein
the case main body portion includes:
  a first surface portion configured to face the first main surface;
  a second surface portion configured to face the second main surface;
  a first side surface portion configured to face the first side end surface; and
  a second side surface portion configured to face the second side end surface, and
  the accommodating portion includes:
    a first accommodating surface portion, which is part of the first surface portion;
    a second accommodating surface portion, which is part of the second surface portion;
    a first accommodating side surface portion, which is part of the first side surface portion; and
    a second accommodating side surface portion, which is part of the second side surface portion,
  the lid portion includes:
    a first lid surface portion, which is part of the first surface portion;
    a second lid surface portion, which is part of the second surface portion;
    a first lid side surface portion, which is part of the first side surface portion; and
    a second lid side surface portion, which is part of the second side surface portion,
    the first accommodating side surface portion and the first lid side surface portion are formed integrally, and
    the lid portion is configured to enter the open state by folding a boundary between the first accommodating side surface portion and the first lid side surface portion.

11. The case according to claim 10, wherein
a protruding piece that protrudes from the second lid side surface portion is provided, and
the protruding piece is configured to engage with an inner surface of the second accommodating side surface portion when the lid portion is in the closed state.

12. The case according to claim 10, wherein
a lock member that protrudes from the second accommodating side surface portion is provided,
the lock member is configured to be able to fold with respect to the second accommodating side surface portion so as to be able to have a locked position of locking the lid member in the locked state and an unlocked position at which the lid member can move from the closed state to the open state, and
the lock member includes a protrusion that can engage with an engaged portion formed on the lid portion which at the locked position.

13. The case according to claim 9, wherein the accommodating portion is provided with at least one restricting portion for restricting the controller accommodated in the accommodating space from moving toward the second end portion.

14. The case according to claim 9, wherein the second accommodating side surface portion of the accommodating portion is formed by overlaying a plurality of plate materials.

15. The case according to claim 1, further comprising
a holding member attached to the first end portion side of the case main body portion,
wherein the holding member has a through hold formed at a position opposing the operation button of the second operation portion when the controller is accommodated in the accommodating space, and
the holding member is configured to hold the movable member such that the first region of the movable member is exposed to the outside from the through hole.

16. The case according to claim 1, wherein a stopper portion for restricting the movable member from separating from the through hold and for restricting the movable member from moving toward the second end portion is provided on the movable member.

17. A case configured to accommodate a controller, the controller including:
a first main surface; a second main surface provided on a side opposite to the first main surface; a first side surface and a second side surface provided on both ends in a longer direction of the first main surface and the second main surface; and a first side end surface and a second side end surface provided on both ends in a shorter direction of the first main surface and the second main surface, the controller further including: a first operation portion provided on the first main surface; a second operation portion provided on the first end surface; a third operation portion provided on the second main surface; and an image capturing section provided on the second end surface, the case comprising
a case main body portion having an accommodating space that can accommodate the controller, at least a portion of the case main body portion being made of paperboard;
a movable member disposed at a position opposing an operation button included on the second operation portion when the controller is accommodated in the accommodating space, the movable member includes:
  a first region that can be operated by a user; and
  a second region that can press the operation button of the second operation portion in response to the operation on the first region when the controller is accommodated in the accommodating space; and
at least one protruding portion protruding at a first height from a surface of the case main body portion, at least, when the case is assembled,
wherein the case main body portion includes:
a first surface portion configured to face the first main surface;
a second surface portion configured to face the second main surface;
a first end portion configured to face the first end surface;
a second end portion configured to face the second end surface;
a first side surface portion configured to face the first side end surface; and
a second side surface portion configured to face the second side end surface, and
the case main body portion is provided with:
a first opening portion that is provided on the second end portion side and is for allowing image capture of the outside of the case main body portion by the image capturing section when the controller is accommodated in the accommodating space;
a second opening portion from which at least part of the first operation portion is exposed when the controller is accommodated in the accommodating space; and
a third opening portion from which at least part of the third operation portion is exposed when the controller is accommodated in the accommodating space.

18. The case according to claim 17, wherein
the case main body portion includes:
  an accommodating portion that includes an insertion port into which the controller is to be inserted, and is for accommodating the controller in a state in which part of the first end surface side is exposed from the insertion port; and
  a lid portion to be connected to part of the accommodating portion so as to cover part of the first end surface side of the controller exposed from the accommodating portion, and
  the lid portion is configured to be able to enter a closed state in which the insertion port is closed, and an open state in which the insertion port is open and part of the first end surface side of the controller is exposed.

19. The case according to claim 18, wherein
the accommodating portion includes:
  a first accommodating surface portion, which is part of the first surface portion;
  a second accommodating surface portion, which is part of the second surface portion;
  a first accommodating side surface portion, which is part of the first side surface portion; and
  a second accommodating side surface portion, which is part of the second side surface portion;
  the lid portion includes:
    a first lid surface portion, which is part of the first surface portion;
    a second lid surface portion, which is part of the second surface portion;
    a first lid side surface portion, which is part of the first side surface portion; and
    a second lid side surface portion, which is part of the second side surface portion,
    the first accommodating side surface portion and the first lid side surface portion are integrally connected, and
    the lid portion is configured to enter the open state by folding a boundary between the first accommodating side surface portion and the first lid side surface portion.

20. The case according to claim 19, wherein
the at least one protruding portion includes a protruding piece that protrudes from the second lid side surface portion, and
the protruding piece is configured to engage with an inner surface of the second accommodating side surface portion when the lid portion is in the closed state.

21. The case according to claim 19, wherein
a lock member that protrudes from the second accommodating side surface portion is provided,
the lock member is configured to be able to fold with respect to the second accommodating side surface portion so as to be able to have a locked position of locking the lid member in the locked state and an unlocked position at which the lid member can move from the closed state to the open state, and
the lock member includes a protrusion that can engage with an engaged portion formed on the lid portion when at the locked position.

22. The case according to claim 21, wherein
the lock member is formed into a plate shape, and is configured to come into contact with the second lid side surface portion when the protrusion is engaged with the engaged portion, and
a finger insertion portion for hooking the lock member with a finger is formed on the second lid side surface portion of the lid portion.

23. The case according to claim 17, wherein the accommodating portion is provided with at least one restricting portion for restricting the controller accommodated in the accommodating space from moving toward the second end portion.

24. The case according to claim 23, wherein the restricting portion is provided inside of the accommodating portion and is configured to come into contact with the second end surface of the controller.

25. The case according to claim 23, wherein the restricting portion is made of a plurality of layers of a plate material.

26. A case configured to accommodate a controller, the controller including:
  a first main surface; a second main surface provided on a side opposite to the first main surface; a first side surface and a second side surface provided on both ends in a longer direction of the first main surface and the second main surface; and a first side end surface and a second side end surface provided on both ends in a shorter direction of the first main surface and the second main surface, the controller further including: a first operation portion provided on the first main surface; a second operation portion provided on the first end surface; a third operation portion provided on the second main surface; and an image capturing section provided on the second end surface, the case comprising:
  a case main body portion having an accommodating space in which the controller can be accommodated;

a movable member disposed at a position opposing an operation button included on the second operation portion when the controller is accommodated in the accommodating space, the movable member includes:

a first region that can be operated by a user; and a second region that can press the operation button of the second operation portion in response to the operation on the first region when the controller is accommodated in the accommodating space; and at least one protruding portion protruding from the case main body portion, wherein the case main body portion is formed into a lengthwise shape including:

a first end portion configured to face the first end surface of the controller when the controller is accommodated in the accommodating space; and a second end portion configured to face the second end surface of the controller when the controller is accommodated in the accommodating space, the case main body portion is provided with:

a first opening portion that is provided on the second end portion side and is for allowing image capture of the outside of the case main body portion by the image capturing section when the controller is accommodated in the accommodating space;

a second opening portion from which at least part of the first operation portion is exposed when the controller is accommodated in the accommodating space; and a third opening portion from which at least part of the third operation portion is exposed when the controller is accommodated in the accommodating space, the protruding portion is disposed on the first end portion side with respect to the third opening portion, and the case being made of paperboard.

* * * * *